United States Patent
Akiba et al.

(10) Patent No.: US 9,930,873 B2
(45) Date of Patent: Apr. 3, 2018

(54) FISHLINE GUIDE

(71) Applicant: GLOBERIDE, INC., Tokyo (JP)

(72) Inventors: Masaru Akiba, Tokyo (JP); Eiji Sugaya, Tokyo (JP); Hideyuki Naitou, Tokyo (JP); Atsushi Saitou, Tokyo (JP); Hiroyuki Mori, Tokyo (JP); Tomoyoshi Turufuji, Tokyo (JP); Masayuki Watanabe, Tokyo (JP)

(73) Assignee: GLOBERIDE, INC., Higashikurume-shi, Tokyo (JP)

( * ) Notice: Subject to any disclaimer, the term of this patent is extended or adjusted under 35 U.S.C. 154(b) by 989 days.

(21) Appl. No.: 13/767,617

(22) Filed: Feb. 14, 2013

(65) Prior Publication Data

US 2013/0192120 A1    Aug. 1, 2013

Related U.S. Application Data

(63) Continuation of application No. 12/662,039, filed on Mar. 29, 2010, now Pat. No. 8,387,302.

(30) Foreign Application Priority Data

Mar. 30, 2009   (JP) ................. 2009-083178
Mar. 31, 2009   (JP) ................. 2009-086168
(Continued)

(51) Int. Cl.
   *A01K 87/04*    (2006.01)
(52) U.S. Cl.
   CPC .................. *A01K 87/04* (2013.01)
(58) Field of Classification Search
   CPC .................................................. A01K 87/04
(Continued)

(56) References Cited

U.S. PATENT DOCUMENTS 3,769,735 A    11/1973   Cousin
4,616,438 A    10/1986   Ohmura
(Continued)

FOREIGN PATENT DOCUMENTS

JP    359677 (Z)    7/1946
JP    60-95858      6/1985
(Continued)

OTHER PUBLICATIONS

Japanese Office Action dated Aug. 6, 2013 in Japanese Patent Application No. 2009-151013.
(Continued)

*Primary Examiner* — Lisa L Tsang
(74) *Attorney, Agent, or Firm* — McGinn IP Law Group, PLLC.

(57) ABSTRACT

A set of fishline guides which are configured to be attached to a rod in an axial direction of the rod, each of the set of fishline guides includes a frame including a fixing portion configured to be attached to an outer surface of the rod, a ring holding portion to which a guide ring through which a fishline passes is attached, and a support leg connecting the fixing portion to the ring holding portion, the fixing portion being in a plane transverse to a plane of the ring holding portion. The frame includes a plurality of fiber-reinforced resin layers foamed by laminating a plurality of fiber-reinforced prepregs in which a reinforcing fiber is impregnated with a synthetic resin. A normal line to a plane of each of the fiber-reinforced resin layers forming the ring holding portion coincides with an axial direction of the ring holding portion.

20 Claims, 21 Drawing Sheets

(30) Foreign Application Priority Data

| | | | |
|---|---|---|---|
| Mar. 31, 2009 | (JP) | ................................. | 2009-086666 |
| Jun. 25, 2009 | (JP) | ................................. | 2009-151013 |
| Nov. 26, 2009 | (JP) | ................................. | 2009-268638 |
| Nov. 30, 2009 | (JP) | ................................. | 2009-271562 |
| Jan. 28, 2010 | (JP) | ................................. | 2010-016496 |
| Jan. 28, 2010 | (JP) | ................................. | 2010-016499 |

(58) Field of Classification Search
USPC .......................................................... 43/24
See application file for complete search history.

(56) References Cited

U.S. PATENT DOCUMENTS

| | | | |
|---|---|---|---|
| 4,682,439 A | | 7/1987 | Inoue et al. |
| 5,347,743 A | | 9/1994 | Tokuda et al. |
| 5,832,653 A | * | 11/1998 | Tsurufuji ........................... 43/24 |
| 6,189,255 B1 | * | 2/2001 | Muneki et al. ................... 43/24 |
| 6,192,615 B1 | | 2/2001 | Ono et al. |
| 6,334,272 B1 | | 1/2002 | Akiba et al. |
| 6,543,178 B2 | * | 4/2003 | Sunaga et al. ................... 43/24 |
| 7,305,792 B2 | | 12/2007 | Kato et al. |
| 2003/0115789 A1 | | 6/2003 | Morimoto et al. |
| 2006/0283073 A1 | | 12/2006 | Omura |
| 2010/0263257 A1 | | 10/2010 | Akiba et al. |

FOREIGN PATENT DOCUMENTS

| | | |
|---|---|---|
| JP | 60-151363 | 10/1985 |
| JP | 9-233978 A | 9/1997 |
| JP | 2001-37377 A | 2/2001 |
| JP | 2002-262725 (A) | 9/2002 |
| JP | 2006-340661 A | 12/2006 |
| JP | 2010-233473 A | 10/2010 |

OTHER PUBLICATIONS

Japanese Office Action dated Aug. 6, 2013 in Japanese Patent Application No. 2012-255582.
Japanese Office Action dated Aug. 8, 2013 in Japanese Patent Application No. 2012-249848.
Japanese Office Action dated Aug. 8, 2013 in Japanese Patent Application No. 2012-250366.
English translation of Japanese Office Action dated Sep. 20, 2012 in JPA No. 2009-083178.
English translation of Japanese Office Action dated Sep. 20, 2012 in JPA No. 2009-086168.
English translation of Japanese Office Action dated Sep. 25, 2012 in JPA No. 2009-086666.
European Search Report dated Aug. 12, 2010.
Office Action dated Jun. 14, 2011 in U.S. Appl. No. 12/662,039.
Office Action dated Sep. 28, 2011 in U.S. Appl. No. 12/662,039.
Advisory Action dated Jan. 9, 2012 in U.S. Appl. No. 12/662,039.
Office Action dated Feb. 10, 2012 in U.S. Appl. No. 12/662,039.
Office Action dated May 30, 2012 in U.S. Appl. No. 12/662,039.
Advisory Action dated Sep. 11, 2012 in U.S. Appl. No. 12/662,039.
Notice of Allowance dated Nov. 1, 2012 in U.S. Appl. No. 12/662,039.
Supplemental Notice of Allowance dated Jan. 4, 2013 in U.S. Appl. No. 12/662,039.

* cited by examiner

FISHLINE GUIDE

The present application is a Continuation application of U.S. patent application Ser. No. 12/662,039, filed on Mar. 29, 2010, which is based on and claims priority from Japanese patent application Nos. JP 2009-083178, filed on Mar. 30, 2009, JP 2009-086168, filed on Mar. 31, 2009, JP 2009-086666, filed on Mar. 31, 2009, JP 2009-151013, filed on Jun. 25, 2009, JP 2009-268638, filed on Nov. 26, 2009, JP 2009-271562, filed on Nov. 30, 2009, JP 2010-016496, filed on Jan. 28, 2010, and JP 2010-016499, filed on Jan. 28, 2010, the entire contents of which are incorporated herein by reference.

BACKGROUND OF INVENTION

The present invention relates to a fishline guide, which is mounted on a fishing rod to guide a fishline, and specifically, to a fishline guide that is characterized by a frame portion which holds a guide ring through which a fishline passes.

BACKGROUND ART

Conventionally, the above-mentioned fishline guide is configured to have a frame to be mounted on the outer circumferential surface of a fishing rod, and a guide ring which is fixed and attached to the frame and through which a fishline actually passes. Typically, the frame is integrally formed by press-working a plate material made of metal such as stainless steel or titanium, as described in, for example, JP-A-2006-340661, and in the frame, a ring holding portion for holding the guide ring through which a fishline passes and a fixing portion for mounting on the outer surface of the fishing rod are integrally foil led.

In the above-mentioned prior art, since the frame is made of a metal material, its weight is heavy, characteristics such as relative strength, relative rigidity, and bending properties are poor, and this blocks improvements in the performance of the fishing rod. For example, in a fishing rod in which a further reduction in weight is required, if a plurality of the fishline guides as described above is mounted along an axial length direction, the desired performance cannot be exhibited.

SUMMARY OF INVENTION

The present invention has been made in view of the above-mentioned problems and has an object to provide a fishline guide which is light in weight and has excellent relative strength, relative rigidity, and bending properties.

To achieve the above object, a method of manufacturing a fishline guide according to the present invention comprises:

forming a plate member by thermal hardening a fiber-reinforced prepreg; and molding a frame from the plate member.

Preferably, the prepreg is thermally hardened in a state that the prepreg is bent, so that a bent portion is formed at the plate member.

Preferably, the prepreg is thermal hardened while being bent at at least one portion which is to be formed into a bent portion of the frame.

Preferably, the frame includes a fixing portion to be attached to a fishing rod, a fishline passing hole portion and a support leg portion connecting the fixing portion to the hole portion, and the first bent portion is formed at a boundary portion between the fixing portion and the leg portion.

Preferably, the second bent portion is formed at the leg portion, a bent angle of the first bent portion is larger than a bent angle of the second bent portion.

Preferably, the frame is cut out from the plate-shaped body.

Preferably, the frame is molded in such a manner that a portion of the plate member other than a portion corresponding to the frame is removed to leave the portion corresponding to the frame.

Preferably, the frame is molded by carrying out a press work, or cutting out the frame by liquid, or a cutting tool.

Preferably, the method further comprises performing a surface polishing process on the frame by a barrel processing.

Preferably, the frame is molded by using a metallic mold, and the bent portion is thermally hardened by applying a stronger pressure compared to regions in the front and the rear thereof.

A fishline guide according to the present invention comprises: a frame which includes a plurality of fiber-reinforced resin layers formed by laminating a plurality of fiber-reinforced prepregs in which reinforcing fiber is impregnated with synthetic resin.

Preferably, the frame includes a fixing portion to be attached to a fishing rod, a fishline passing hole portion and a support leg portion connecting the fixing portion to the hole portion.

Preferably, the plurality of fiber-reinforced resin layers are laminated in a direction substantially perpendicular to a plane of the hole portion.

Preferably, at least three of the fiber-reinforced resin layers are laminated.

Preferably, the plurality of fiber-reinforced resin layers are laminated so that the fibers of the plurality of fiber-reinforced resin layers extends in at least three different directions.

Preferably, the frame is formed such that the amount of reinforcing fibers, which are oriented in an intersection direction having an angle with respect to a longitudinal direction thereof, is larger than the amount of reinforcing fibers which are oriented in the longitudinal direction, where the longitudinal direction is from the fixing portion toward the ring holding portion.

Preferably, the frame is formed such that reinforcing fibers are disposed in an axial length direction at a neutral axis area which is an intermediate position in the thickness direction of the frame, reinforcing fibers are disposed in a direction intersecting with the axial length direction at the outer side of the neutral axis area, and a woven fabric layer which is woven by reinforcing fibers is disposed at the outermost layer.

Preferably, the frame is formed such that the thickness of a prepreg which is disposed at the outermost layer is thinner than the thickness of a prepreg which is disposed at a neutral axis area which is an intermediate position in the thickness direction of the frame.

Preferably, the plurality of fiber-reinforced resin layers includes axial length fibers, which extend in a direction from the fixing portion toward the hole portion, and oblique fibers, which extend obliquely.

Preferably, the plurality of fiber-reinforced resin layers include a woven fiber-reinforced resin layer disposed at an outermost layer of the frame.

Preferably, the woven fabric layer is formed such that the width of a mesh of main fibers composed of reinforcing fibers is smaller than the width of the support leg portion of the frame.

Preferably, the bent portion is formed so as to have a higher ratio of fibers than regions in the front and the rear thereof.

Preferably, the bent portion is formed such that the amount of impregnated synthetic resin in an outer layer portion of the inner side of the bent portion is larger than the amount of impregnated synthetic resin in a neutral axis portion in the thickness direction.

Preferably, the plurality of fiber-reinforced resin layers includes:

a first fiber-reinforced resin layer having a fiber extending at a first angle oblique to a longitudinal direction in which the leg portion extends;

a second fiber-reinforced resin layer having a fiber extending at a second angle oblique to the longitudinal direction, wherein the first and second angles are symmetric about the longitudinal direction, and the first and second fiber-reinforced resin layer are symmetrically disposed on opposite sides of a central plate of the frame.

Preferably, the plurality of fiber-reinforced resin layers includes:

a first fiber-reinforced resin layer having a fiber extending at a first angle oblique to a longitudinal direction in which the leg portion extends;

a second fiber-reinforced resin layer having a fiber extending at a second angle oblique to the longitudinal direction, wherein the first and second angles are opposite to each other about the longitudinal direction.

Preferably, the amount of fibers in the first fiber reinforcing resin layer is the same as the amount of fibers in the second fiber reinforcing resin layer.

Preferably, the plurality of fiber-reinforced resin layers includes:

a first fiber-reinforced resin layer having a fiber extending in a longitudinal direction in which the leg portion extends;

a second fiber-reinforced resin layer which has a fiber crossing with the longitudinal direction and disposed at one side of the first fiber-reinforced resin layer; and a third fiber-reinforced resin layer which has a fiber crossing with the longitudinal direction and disposed at the other side of the first fiber-reinforced resin layer.

Preferably, a side surface of the frame is formed in such a manner that the plurality of the fiber-reinforced resin layers appearing on the side surface are made flush with each other.

Preferably, a surface shape of the side surface is a convex shape.

Preferably, at the side surface formed to have a surface shape of a convex surface shape, curvature of the front face side and the back face side is smaller than that of the central side.

Preferably, the side surface of the frame is formed in a smooth surface shape.

Preferably, the front and back faces of the frame are formed by woven fabric-shaped fiber-reinforced prepregs.

Preferably, the plurality of fiber-reinforced resin layers includes a fiber-reinforced resin layer having a fiber extending in a longitudinal direction in which the leg portion extends.

Preferably, a reinforcement layer is interposed among a plurality of fiber-reinforced resin layers.

Preferably, a reinforcement layer is disposed further toward the outer face side than an intermediate position among the plurality of fiber-reinforced resin layers.

Preferably, reinforcing fibers constituting the reinforcement layer are disposed to be arranged in one direction.

Preferably, the reinforcement layer is formed with a reinforcement piece which is provided at the bent portion.

Preferably, the frame is constituted into a flat plate form, and an opening is provided in the fixing portion of the frame.

Preferably, the support leg portion is integrally formed with the fixing portion through a bent portion, and the fixing portion is formed so that the amount of reinforcing fibers is smaller than that of the bent portion over more than half of the entire length of the fixing portion, or so that it has a high ratio of reinforcing fibers with low elastic modulus.

Preferably, a lamination shaping material which forms the fixing portion is formed with reinforcing fibers which have a smaller elastic modulus than reinforcing fibers in the axial length direction of the fishing rod tube, and the thickness of the fixing portion is formed to be thicker than the thickness of the fishing rod tube.

Preferably, a resin layer is disposed on at least the side of the fixing portion which comes into contact with the fishing rod tube, and the fixing portion is fixed to the fishing rod tube through the resin layer.

Preferably, the reinforcing fibers of the lamination shaping material are exposed on at least the side of the fixing portion which comes into contact with the fishing rod tube, and the side where the reinforcing fibers are exposed is positioned on and fixed to the fishing rod tube.

Preferably, the ring holding portion has reinforcing fibers disposed in the circumferential direction of the ring holding portion.

Preferably, the support leg portion has a bent portion, and the thickness of the bent portion is set to be thicker than the thickness of the ring holding portion.

DESCRIPTION OF EMBODIMENTS

First Embodiment

Hereinafter, embodiments of a fishline guide according to the present invention and a manufacturing method thereof will be explained with reference to the drawings.

Figure 1:
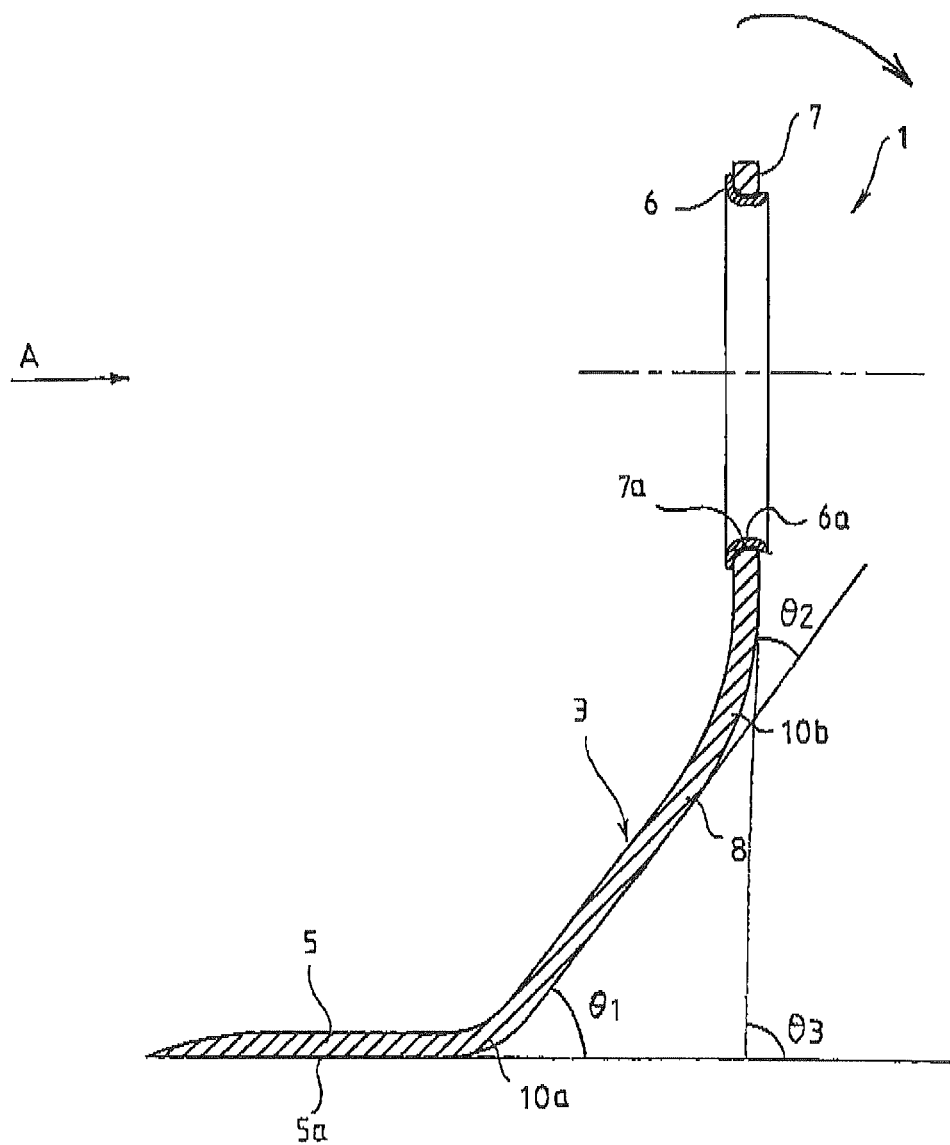
FIG. 1 is a vertical cross-sectional view showing one configuration example of a fishline guide according to the present invention.
Figure 2:
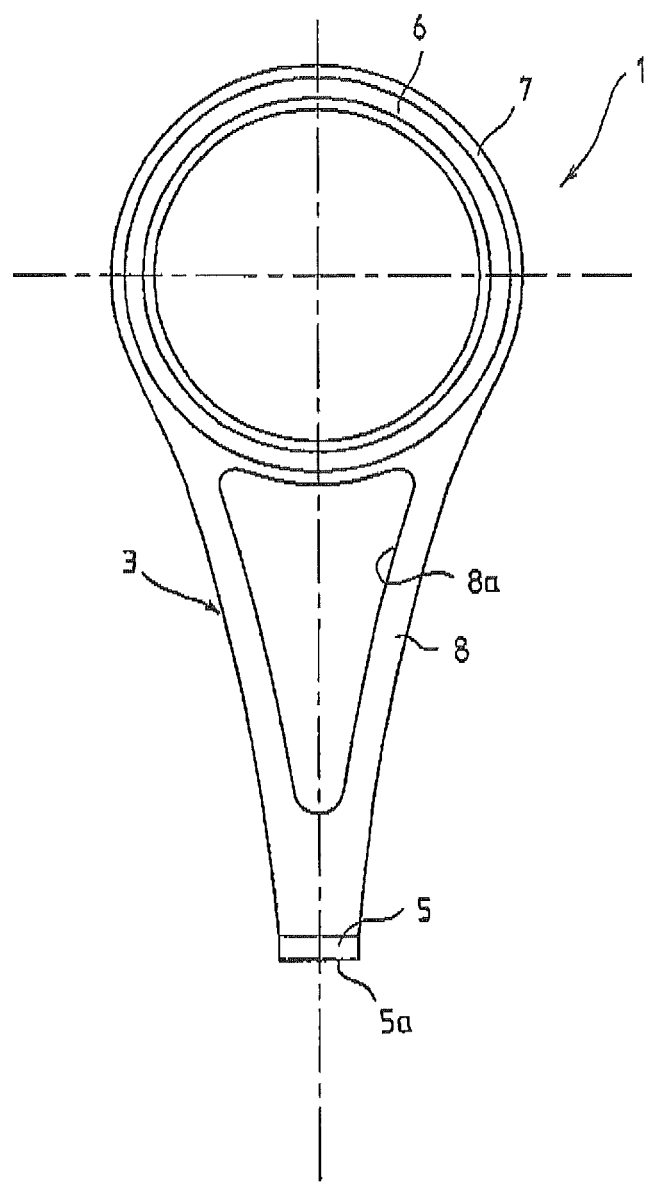
FIG. 2 is a view as viewed from the direction of an arrow A of FIG. 1.
Figure 3:
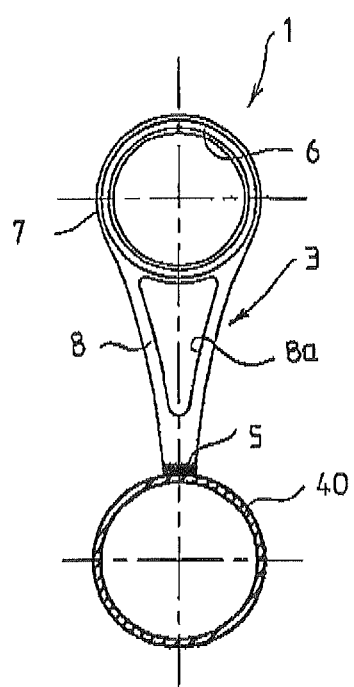
FIG. 3 is a view showing a state where the fishline guide is mounted on a fishing rod (fishing rod tube).

First, one configuration example of the fishline guide according to the present invention is explained with reference to FIGS. 1 to 3. In these drawings, FIG. 1 is a vertical cross-sectional view of the fishline guide, FIG. 2 is a view as viewed from the direction of an arrow A of FIG. 1, and FIG. 3 is a view showing a state where the fishline guide is mounted on a fishing rod (fishing rod tube). In addition, in FIG. 1, the direction of the arrow A coincides with the axial length direction of the fishing rod when the fishline guide has been mounted on the fishing rod, and FIG. 3 is a view as viewed the top end side of a fishing rod from the bottom end side of the fishing rod. The fishline guide is mounted in such a manner that a ring holding portion is located on the top end side of the fishing rod and a fixing portion is located on the bottom end side of the fishing rod, and hereinafter, a front side means the top end side of the fishing rod and a rear side means a base end side (the bottom end side of the fishing rod).

A fishline guide 1 has a frame 3 formed by a fiber-reinforced prepreg (hereinafter referred to as a prepreg) in which reinforcing fibers are impregnated with synthetic resin (a configuration of the prepreg and a detailed manufacturing method of the frame will be described later). The frame 3 has a fixing portion 5 which is mounted on the outer surface of a fishing rod (fishing rod tube) 40, a ring holding portion 7 (a fishline passing hole portion), on which a guide ring 6 through which a fishline passes is mounted, and a support leg portion 8 which connects the ring holding portion 7 and the fixing portion 5, and is formed into a plate shape in which a width in the left-right direction is larger than a thickness in the axial direction (the direction of the arrow A of FIG. 1; the front-back direction) of the ring holding portion 7.

The fixing portion 5 is a portion (also referred to as a foot portion) which is fixed to the surface of the fishing rod in a lower end of the frame, and in this embodiment, is fixed by a thread tie, adhesion, or the like in a state where, when the fixing portion has been mounted on the fishing rod, the fixing portion extends in the axial length direction thereof and a contact surface 5a on the back side thereof is positioned on the surface of the fishing rod. In addition, the fixing portion 5 may also have any of various shapes such as 1-foot shape or 2-foot shape. The fixing portion may also be formed into an annular shape and attached to the fishing rod, or may also be constituted as a movable guide which is formed into a tubular shape and disposed on the fishing rod so as to be able to move.

The ring holding portion 7 is a portion which fixes and supports the guide ring 6 so as to be able to guide the fishline in a state where it is separated from the surface of the fishing rod. An opening 7a for fitting and fixing the guide ring 6 is formed in the ring holding portion 7, and the ring holding portion 7 as a whole has an approximately circular outer shape. In addition, the guide ring 6 which is fitted into the opening 7a is configured into a ring shape and formed of a material, which has a small sliding resistance at a fishline guide surface portion 6a which is the inner circumferential surface thereof, such as titanium, aluminum, SUS, ceramics, or the like. After the frame 3 has been integrally formed by the prepregs, the guide ring 6 is fitted into and fixed to the opening 7a of the ring holding portion 7.

The support leg portion 8 is a portion which connects the fixing portion 5 and the ring holding portion 7 so as to separate the guide ring 6 from the surface of the fishing rod. Since the support leg portion 8 can be designed into various lengths in accordance with the kind of guide, it also includes a version which slightly protrudes from the ring holding portion 7.

At least one or more bent portion is formed in the frame 3. In this embodiment, a first bent portion 10a is formed at a boundary portion between the fixing portion 5 and the support leg portion 8, and a second bent portion 10b, which has a gentler bent than the first bent portion, is formed on the ring holding portion 7 side of the support leg portion 8. In this case, the boundary portion corresponds to a region which rises from an end portion of the fixing portion 5, which actually is in a fixed state with respect to the outer surface of the fishing rod, toward the ring holding portion 7.

In a case where the bent portions as described above are formed at the frame 3, in particular, by forming the second bent portion 10b at the support leg portion 8, it becomes possible to set in a stepwise fashion a bending angle by the bending of the frame as a whole, so that it is possible to disperse stress concentration, thereby improving strength. As described above, if a plurality of bent portions 10a and 10b is formed at the frame 3, it is preferable to set a bending angle of a bent portion (in the drawings, the second bent portion 10b corresponds to this) which is formed at the support leg portion 8 to be smaller than that of a bent portion (in the drawings, the first bent portion 10a corresponds to this) which is formed at the boundary portion between the fixing portion 5 and the support leg portion 8 or in the vicinity thereof. Specifically, it is preferable to set a bending angle $\theta 1$ of the bent portion which is formed at the boundary portion between the fixing portion 5 and the support leg portion 8 or in the vicinity thereof to be in the range of 30 degrees to 90 degrees, set a bending angle $\theta 2$ of the bent portion which is formed at the support leg portion 8 to be a smaller angle ($\theta 1 > \theta 2$) than the bending angle $\theta 1$ and in the range of 0 degree to 45 degrees, and set a total of both angles to be 30 degrees or more and 100 degrees or less.

In addition, as shown in FIG. 1, the bending angle is defined by a crossing angle of tangent lines in the front and the rear of the bent portion. As described above, when two bent portions 10a and 10b are formed at the frame, it is preferable that the relationship between the angles be set as described above. With respect to a bending angle (a crossing angle of a tangent line of a lower surface of the fixing portion 5 and the ring holding portion 7) $\theta 3$ between the fixing portion 5 and the ring holding portion 7, it is preferable that it is set to be in the range of 30 degrees to 100 degrees. With respect to the support leg portion 8 described above, a portion between two bent portions 10a and 10b is formed into a straight line shape. However, the portion between two bent portions 10a and 10b may also be formed into a curved surface shape having a given curved surface, or the support leg portion may also be configured to have a curved surface as a whole.

By forming the bent portions so as to have such an angular relationship, stress concentration on a specific bent portion can be prevented, so that stabilization of strength can be achieved.

In addition, the bent portions 10a and 10b which are formed at the frame as described above are regions where breakage or the like easily occurs due to stress concentration. However, by using a manufacturing method and a configuration of a prepreg as described later, improvement in relative strength and relative rigidity can be achieved.

The frame 3 is formed by press working or the like from a prepreg (it is a plate-shaped body after thermal molding) which is in a state where the bent portions having configurations as described above are formed in advance, as described later. However, at this time, it is formed so as to have a given outer shape. In this embodiment, as shown in FIG. 2, in the frame 3, the support leg portion 8 which rises from an end portion of the fixing portion 5 through the first bent portion 10a has a width which gradually widens heading up the support leg portion 8, and is integrally connected to the ring holding portion 7 of an approximately circular shape, in which there is found the opening 7a into which the guide ring 6 is fitted. In this case, as shown in the drawing, for a reduction in weight, an opening (cutout) 8a may also be formed in the support leg portion 8.

Next, a method of forming the frame 3 in a shape as described above will be explained with reference to FIGS. 4 to 6. Here, first, an overall manufacturing process is explained, and then, a laminated state of the prepreg and an arrangement state of reinforcing fibers of the prepreg to be laminated are explained.

As described above, the frame 3 is formed from the prepreg in which reinforcing fibers are impregnated with synthetic resin. In this case, the prepreg is constituted in a state where reinforcing fibers such as carbon fibers or glass fibers are arranged in a given direction, or into a woven sheet form, and has a configuration in which thermosetting resin (for example, epoxy resin) or thermoplastic resin (for example, nylon) is impregnated as matrix resin.

First, the sheet-shaped prepreg as described above is cut into a given shape, and the cut prepregs are stacked so as to become plural layers. The number of sheets (the number of layers) of prepregs which are stacked, or a configuration of individual prepreg is not particularly limited. However, as described above, in consideration of the bent portions 10a and 10b being formed at the frame 3, a load being applied to the frame 3 in use, characteristics or a mounting portion of the fishing rod, on which the fishline guide is mounted, and the like, the kind of prepreg or a stacking condition is arbitrarily adjusted.

Figure 4:
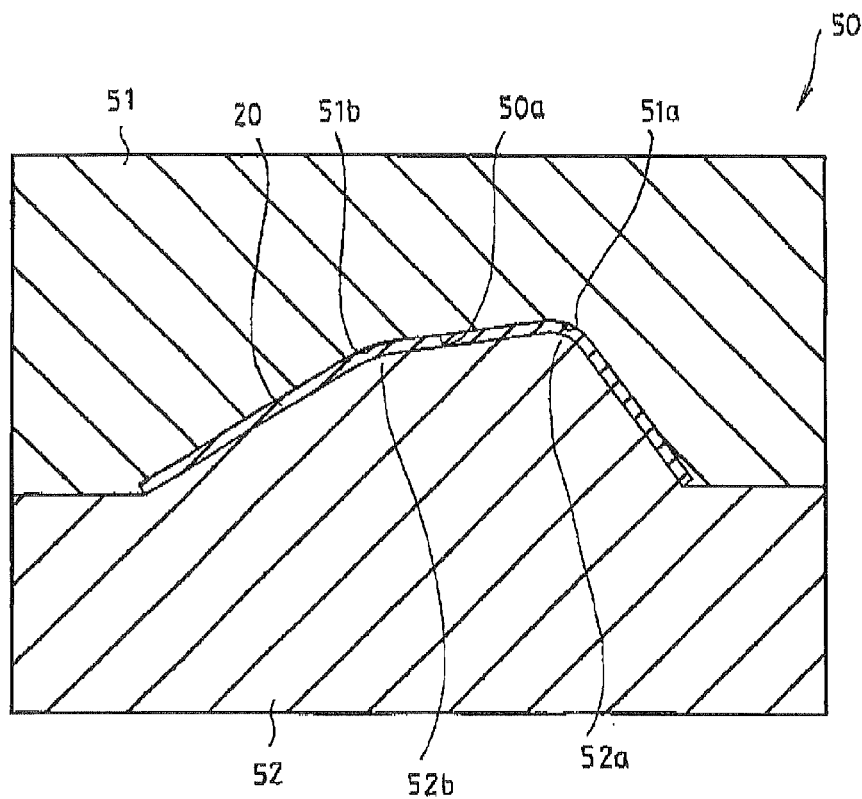
FIG. 4 is a view showing a configuration example of a metallic mold which molds a frame constituting the fishline guide.

The prepreg which is laminated in this manner is set in a metallic mold 50 as shown in FIG. 4. The metallic mold 50 of this embodiment is constituted by an upper mold 51 and a lower mold 52, which are parted above and below, and the laminated prepreg (denoted by reference numeral 20) is set at a given position of the lower mold 52. Between the upper mold 51 and the lower mold 52, a cavity portion 50a is formed corresponding to a position where the laminated prepreg 20 is set, and a mold release agent is coated on a surface region thereof.

The upper mold 51 constituting the metallic mold 50 is configured into a concave shape, the lower mold 52 is configured into a convex shape, and the cavity portion (this cavity portion corresponds to the thickness of the frame 3) 50a is formed between the upper mold and the lower mold such that when the upper mold and the lower mold are pressed, the frame 3 is formed. Then, at the lower mold 52, bent portion forming convex portions 52a and 52b are formed at positions which correspond to the above-described bent portions 10a and 10b when the prepreg 20 laminated into the sheet form is positioned, and at the upper mold 51, bent portion forming concave portions 51a and 51b are formed corresponding to the bent portion forming convex portions 52a and 52b.

In addition, the prepreg 20 is set on the lower mold in a state where the whole of the prepreg 20 is superposed at the same time, or it may also be laminated plural times, such as it being set one by one. By laminating it plural times in this manner, movement of the reinforcing fibers is reduced, so that the prepreg can be set at a given position on the lower mold 52 with high precision. In this embodiment, as described above, since the metallic mold 50 is parted above and below, the prepreg 20 is positioned on the lower mold 52 and maintained in a given shape in accordance with the shape of the metallic mold. Of course, with respect to the metallic mold, only one example is shown, and with respect to a mold parting direction, it is possible to adopt arbitrary aspects such as a left-right direction or an inclined direction.

Then, after the prepreg is set on the lower mold 52, the positioned prepreg 20 is pressed and fixed. With respect to the pressing and fixing, it may also be clamped by the upper mold 51 or pressed by hand or a pressing tool. In this step, a shape corresponding to a frame shape after the molding, which includes bent portions, is maintained, and this allows the occurrence of an internal residual stress after the molding to be prevented, so that an improvement in strength and stabilization of strength can be achieved (in this step, the prepreg is in an uncured state (including a state after provisional cure) and the bent portions are formed prior to thermal hardening).

Thereafter, a heating process is carried out, and after the matrix resin is hardened and molded, a molded article (it is a plate-shaped body 30 having bent portions) is taken out from the metallic mold 50.

In addition, when the bent portions are thermally hardened by pressing by the metallic mold 50, it is preferable that the bent portions be pressed relatively more strongly than regions in the front and the rear thereof. In this manner, by strongly pressing the regions of the bent portions, voids in the bent portions (10a and 10b) of the molded frame can be prevented, so that an improvement in strength and stabilization of strength can be achieved. According to this, the bent portions 10a and 10b of the molded frame 3 can have a higher ratio of fibers than those in the regions (the fixing portion or the support leg portion) in the front and the rear thereof, so that it becomes possible to reinforce the bent portions where breakage or the like easily occurs.

Figure 6:
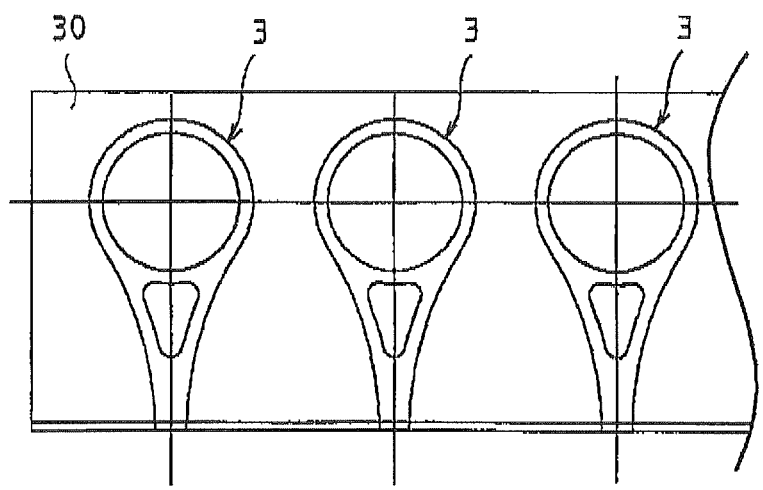
FIG. 6 is a view showing a state where the frame is cut out from a plate-shaped body molded by the metallic mold.

Next, the frame is cut out into a given shape from the plate-shaped body 30 having a plurality of fiber-reinforced resin layers formed by stacking a plurality of prepregs in the thickness direction. As described above, since the prepreg is a plate-shaped body in which the bent portions are formed after the thermal hardening treatment, by adopting an arbitrary method such as cutting by press working, cutting by liquid (water jet or the like), or cutting by a cutting tool (an end mill or the like), it becomes possible to cut out a plurality of frames 3 from one sheet of the plate-shaped body 30, as shown in FIG. 6, and it becomes possible to efficiently manufacture a fishline guide with light weight and high strength. In addition, the cutting-out of the frame may also be carried out by leaving the frame 3 by destroying or removing the unnecessary portions other than the frame 3 of the plate-shaped body.

In addition, at the time of this processing, it is preferable to simultaneously form a basic outer shape of the frame 3, that is, the ring holding portion 7 having the opening 7a, the support leg portion 8 having the opening 8a, and the like. However, these may also be formed in separate processes. With regard to the plate-shaped body 30, it is not limited to a shape of one sheet of simple plane, but the thickness of the lamination may also be varied according to positions, a plate-shaped portion may also have a shape (a T shape, an inverted-Y shape, or the like) extending in plural directions or include a curved surface shape, or a plurality of plate-shaped portions may also be combined.

Next, as necessary, a detailed processing is carried out. The detailed processing corresponds to, for example, a processing for forming a shape of the fixing portion 5 into a curved surface shape so as to make the fixing portion be easily positioned on the fishing rod, or performing polishing or the like of an end portion of the fixing portion for easy thread winding or thread tie.

Next, a surface treatment of the frame having a plurality of fiber-reinforced resin layers formed by stacking a plurality of prepregs in the thickness direction thereof is carried out. For example, burrs on the surface are removed by performing barrel processing, and also finishing polishing (polishing) is carried out to the extent that gloss on the surface is obtained. With respect to the extent of the polishing, it is possible to arbitrarily adjust a polishing agent, polishing time, or the like in accordance with a size, a shape, material characteristics, or the like of the fishline guide. By performing barrel processing, it becomes possible to polish the frame without cutting the reinforcing fibers, so that stabilization of strength can be achieved, and also a fishline guide having an excellent appearance can be obtained.

In addition, when carrying out such a polishing process, it is preferable to perform polishing such that the reinforcing fibers are partly exposed at the surface of the frame, whereby the matrix resin partly remains. By doing so, it becomes possible to further improve gloss of the polished surface.

Next, as necessary, a coating film is formed on the whole or a portion of the frame. For example, it also is possible to perform painting for an improvement in an appearance or protection of a main body of the frame, vapor deposition of metal or ceramics, or the like.

Then, the guide ring 6 is mounted on a portion of the opening 7a of the frame formed as described above. With respect to a mounting method of the guide ring, it is possible to adopt any fixing method such as fitting, adhesion, or curling.

Next, a preferable arrangement aspect or the like of the prepreg when forming the frame 3 from the prepreg as described above will be explained.

Figure 5:
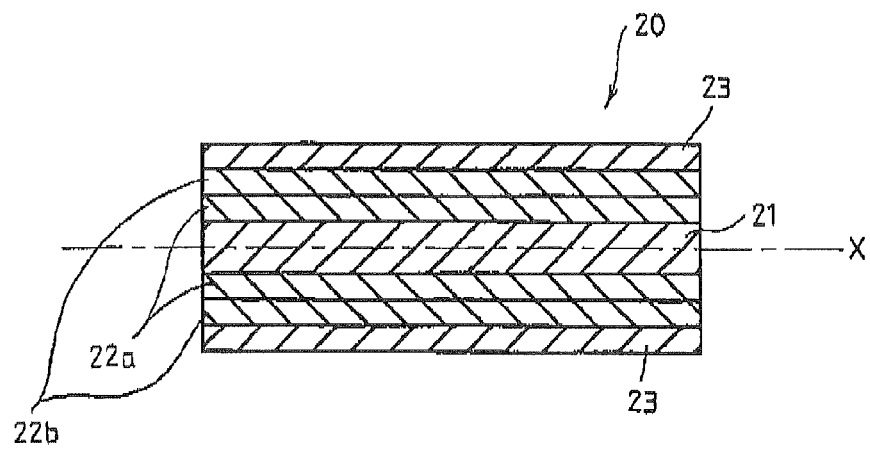
FIG. 5 is a view showing a laminated structure of a prepreg in a frame portion.

The frame 3 of this embodiment is composed of a plurality of fiber-reinforced resin layers in which the prepregs in which reinforcing fibers are impregnated with synthetic resin are laminated. The plurality of fiber-reinforced resin layers are laminated in the thickness direction (a direction approximately perpendicular to a face of the ring holding portion) of the frame 3. In this embodiment, as shown in FIG. 5, the layers include an axial length direction fiber resin layer 21 in which reinforcing fibers are arranged along an axial length direction of the fishing rod, oblique fiber resin layers 22a and 22b in which reinforcing fibers are arranged in a crossing direction having a given angle with respect to the axial length direction of the fishing rod, and woven fabric layers 23 in which reinforcing fibers are woven.

Specifically, in this embodiment, the axial length direction fiber resin layer 21 is disposed by a prepreg in which reinforcing fibers are arranged in the axial length direction, at a neutral axis area (in FIG. 5, a neutral axis is denoted by X) which is an intermediate position in the thickness of the frame, the oblique fiber resin layers 22a and 22b are disposed by prepregs in which reinforcing fibers are arranged at a given angle (the angle of inclination is arbitrary. However, the range of 15 degrees to 75 degrees is preferable, and more preferably, an angle in the range of 30 degrees to 60 degrees) with respect to the axial length direction, at the outer sides (both sides) of the axial length direction fiber resin layer, and the woven fabric layers 23 are disposed by prepregs in which reinforcing fibers are woven, at the outermost layers (they are the entire faces of both sides. However, they may also be regions which partly become the outermost region). In addition, the axial length direction fiber resin layer 21 may also be constituted into plural layers (one layer to four layers). With respect to the oblique fiber resin layers 22a and 22b, the orientation directions of the reinforcing fibers in the respective layers may also be different from each other.

In this manner, when forming the fishline guide made of fiber-reinforced resin, it is preferable to choose and laminate such prepregs in a state where the reinforcing fibers are oriented in at least three directions when viewing the frame itself from the direction of the arrow A, or in a plan view. That is, by setting the orientation directions of the reinforcing fibers to be three or more directions, it becomes possible to efficiently form a fishline guide which is light in weight and excellent in strength, and also, even if a width of the frame is made small, excellent strength can be obtained. In this manner, the frame 3 is made by disposing reinforcing fibers in the axial length direction at the neutral axis area, disposing reinforcing fibers at the outer sides of the neutral axis area in the direction intersecting the axial length direction, and disposing the woven fabric layers 23 in which reinforcing fibers are woven, at the outermost layers, so that the fishline guide 1, in which an improvement in strength and stabilization of strength are achieved without occurrence of cutting, breakage, or the like even with large flexure, can be realized, and also a reduction in weight can be efficiently achieved.

In this configuration, it is preferable that the frame 3 be made by making the amount of reinforcing fibers (the reinforcing fibers of the oblique fiber resin layers 22a and 22b), which are oriented in a crossing direction having an angle with respect to a longitudinal direction from the fixing portion 5 toward the ring holding portion 7, be larger than the amount of reinforcing fibers (the reinforcing fibers of the length direction fiber resin layer 21) which are oriented in the longitudinal direction. According to this, it is possible to obtain a fishline guide in which even if the fishline guide 1 is greatly bent so that the frame 3 is bent due to a large load in the direction of an arrow of FIG. 1, breakage hardly occurs.

In this configuration, the frame 3 is made such that the thicknesses of the prepregs (the woven fabric layers 23) which are disposed at the outermost layers are thinner than the thickness of the prepreg (the length direction fiber layer 21) which is disposed at the neutral axis area. If doing so, relative strength is improved, peeling of the reinforcing fibers from the end portion can be prevented, and large bending becomes possible.

As in the above-described arrangement configuration of the prepregs, it is preferable to dispose the woven fabric layers 23 at the outermost layers of the frame 3. In view of the fact that the surfaces of the frame 3 are portions where it is easy for other objects to touch, so that peeling or the like easily occurs, and that there is a possibility that the frame is bent due to tension of the fishline at the time of the actual fishing, so that the reinforcing fibers are peeled from the end portion of the frame or broken, by disposing the woven fabric layers in which reinforcing fibers are woven at these surface regions, crack or peeling of the reinforcing fibers can be effectively prevented and an improvement in strength and stabilization of strength can be achieved.

Figure 8:
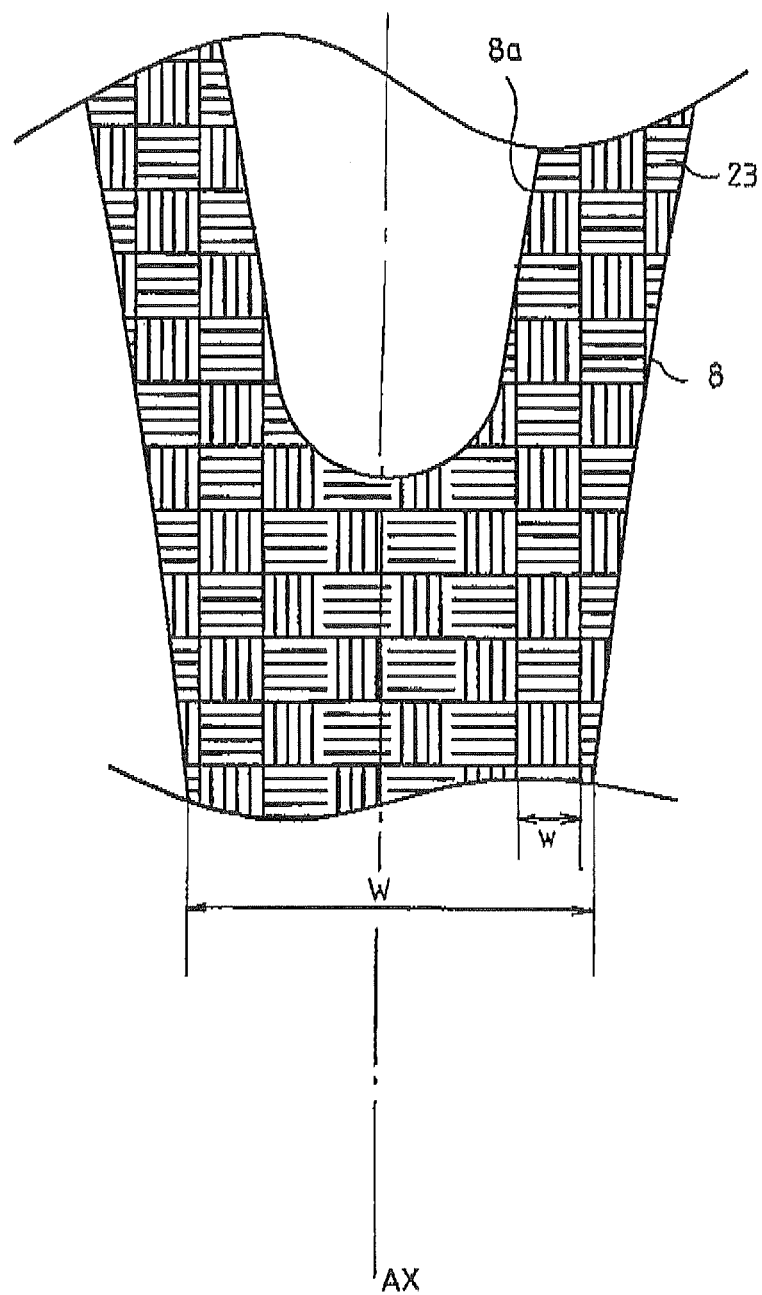
FIG. 8 is a view showing an arrangement state of fibers in a support leg portion of the frame.

With respect to the woven fabric layer 23, as shown in FIG. 8, it is preferable to use a woven fabric layer in which the width w of a mesh of main fibers composed of reinforcing fibers (usually, since a plurality of reinforcing fibers are bundled, thereby constituting a fiber bundle, and the fiber bundles are woven into a fabric form, the mesh is specified by the width of the fiber bundle) is smaller than the width W (here, the width corresponds to the width of the smallest width portion of the support leg portion) of the support leg portion 8 of the frame 3.

By disposing such woven fabric layers 23, peeling or breakage of the reinforcing fibers can be more reliably prevented and an improvement in strength and stabilization of strength can be achieved. With respect to the bent portions 10a and 10b, they can be relatively reinforced, so that it becomes possible to obtain a fishline guide which has excellent balance in terms of strength and light weight. Of course, with respect to the width of the mesh of the above-mentioned woven fabric layer 23, it is preferable that also at a region of the fixing portion 5 or the ring holding portion 7, the width of a mesh be likewise made to be smaller than the smallest width of these portions.

In addition, in the embodiment shown in FIG. 8, a direction of the mesh of the woven fabric is along an axial length direction AX. However, it is preferable to make this be inclined at an angle of 45±15 degrees or 45±30 degrees with respect to the axial length direction AX. By inclining it in this manner, breakage or peeling of the reinforcing fibers can be prevented. The entire layer may also be constituted by the woven fabric layer as described above.

As in the above-described configuration, it is preferable to dispose the axial length direction fiber resin layer 21 at an intermediate layer region of the frame 3. Therefore, even if a bending force acts on the frame 3 along the axial length direction due to tension or the like of the fishline, it becomes possible to efficiently increase the relative rigidity in the direction while achieving a reduction in weight.

The frame 3 which is formed in this manner is not limited to a plane shape with the same thickness, but the thickness thereof, the amount or elastic modulus in tension of the reinforcing fibers may be changed or adjusted in accordance with portions. The adjustment of the thickness, the amount or the elastic modulus in tension of reinforcing fibers can be performed by variously changing the thickness of a lamination or fiber-reinforced prepregs to be laminated, when forming the plate-shaped body 30.

In particular, by forming more than half of a region of the entire length of the fixing portion 5 by making the amount of reinforcing fibers thereof be smaller than those of the bent portions 10a and 10b or increasing a ratio of reinforcing fibers with low elastic modulus, it is possible to achieve an improvement in relative strength of the bent portions 10a and 10b in the frame 3, thereby improving strength and durability of the whole of the fishline guide 1, and improve strength, stabilization, and bending balance of the fishing rod, to which the fishline guide 1 is attached. For example, as explained in the above-described process, by increasing a pressing force of regions of the bending portions at the time of the thermal molding, it is possible to make the resin flow out, thereby increasing a ratio of the fibers of the bent portions, and by configuring in this manner, it becomes possible to make a fishline guide which is hardly broken even when the frame is bent due to the action of a load.

Figure 7:
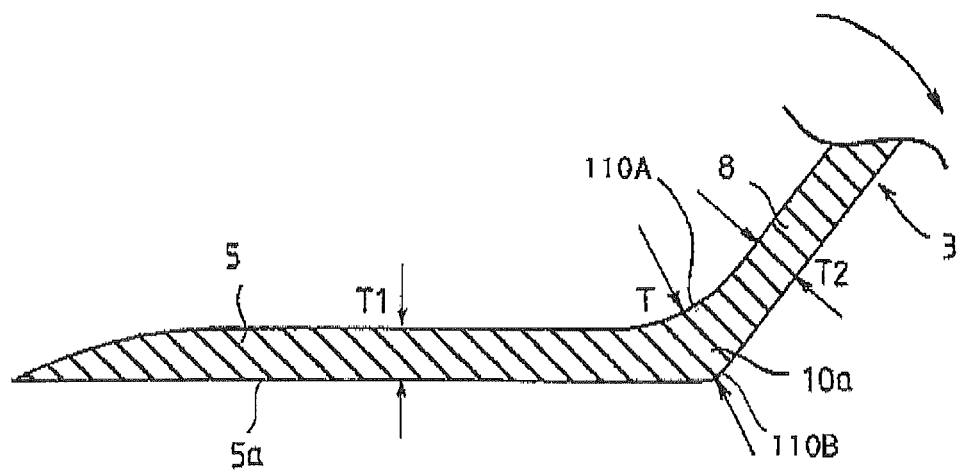
FIG. 7 is an enlarged cross-sectional view of a fixing portion region of the frame.

As shown in FIG. 7, the bent portion 10a on the fixing portion 5 side is formed such that a radius of an inner curved surface 110A which forms a smaller angle than 180 degrees between the support leg portion 8 and the fixing portion 5 is larger than a radius of an outer curved surface 110B which forms a larger angle than 180 degrees and the thickness T of the bent portion 10a is thicker than the thickness T1 at an intermediate position in the length direction of the fixing portion. The thickness T of the bent portion 10a is formed to be thicker than the thickness T2 of the support leg portion 8.

By this, the inner curved surface 110A is curved more gently than the outer curved surface 110B, and the thickness of this portion is increased, so that relative strength of the bent portion 10a can be improved more than the support leg portion 8 and the fixing portion 5 in the frame 3 and it becomes possible to effectively prevent breakage at the bent portion. Accordingly, the whole of the frame 3 is thinned, and strength and durability of the whole of the fishline guide 1 can be improved. Strength, stabilization, and bending balance of the fishing rod, to which the fishline guide 1 is attached, can be improved.

With respect to the bent portion, it is preferable to make the impregnation amount of synthetic resin of an outer layer portion (the curved surface 110A side) of the inside of the bent portion be larger than the impregnation amount of synthetic resin of a neutral axis portion in the thickness direction.

As described above, since a large load often acts on the frame portion in the direction of an arrow of FIG. 7 when a tension by the fishline acts on the frame portion, breakage or the like easily occurs from the outer layer portion (the side denoted by P) of the inside of the bent portion. For this reason, by increasing the impregnation amount of resin on such a region side, it becomes possible to make a fishline guide which hardly breaks even when the frame is bent due to a load.

According to the fishline guide which is formed according to the manufacturing method as described above, compared to a fishline guide made of metal, a configuration can be obtained in which weight is light and also relative strength, relative rigidity, and bending properties are excellent. For this reason, even if such as fishline guide is mounted in a plurality of pieces, the entire weight of the fishing rod is not increased, and performance of the fishing rod is improved. In particular, at a portion such as a tip rod, a further reduction in weight can be achieved, so that a delicate touch is easily sensed, whereby further improvement in performance of the fishing rod can be achieved.

Although the embodiment of the present invention has been described above, the present invention is not limited to the above-described configuration, but various modifications are possible.

The present invention has features that the frame portion constituting the fishline guide is constituted by the fiber-reinforced prepreg and also the arrangement aspect of the prepreg as described above is used such that relative strength, relative rigidity, and the like are increased and breakage or the like does not occur in particular at a region of the bent portion. With respect to the prepreg constituting the above-described frame, the kind or the elastic modulus of the reinforcing fibers, the impregnation amount of resin, a configuration such as a thickness, a laminated state, and the like can be modified in various ways without being limited to the embodiment.

Figure 9:
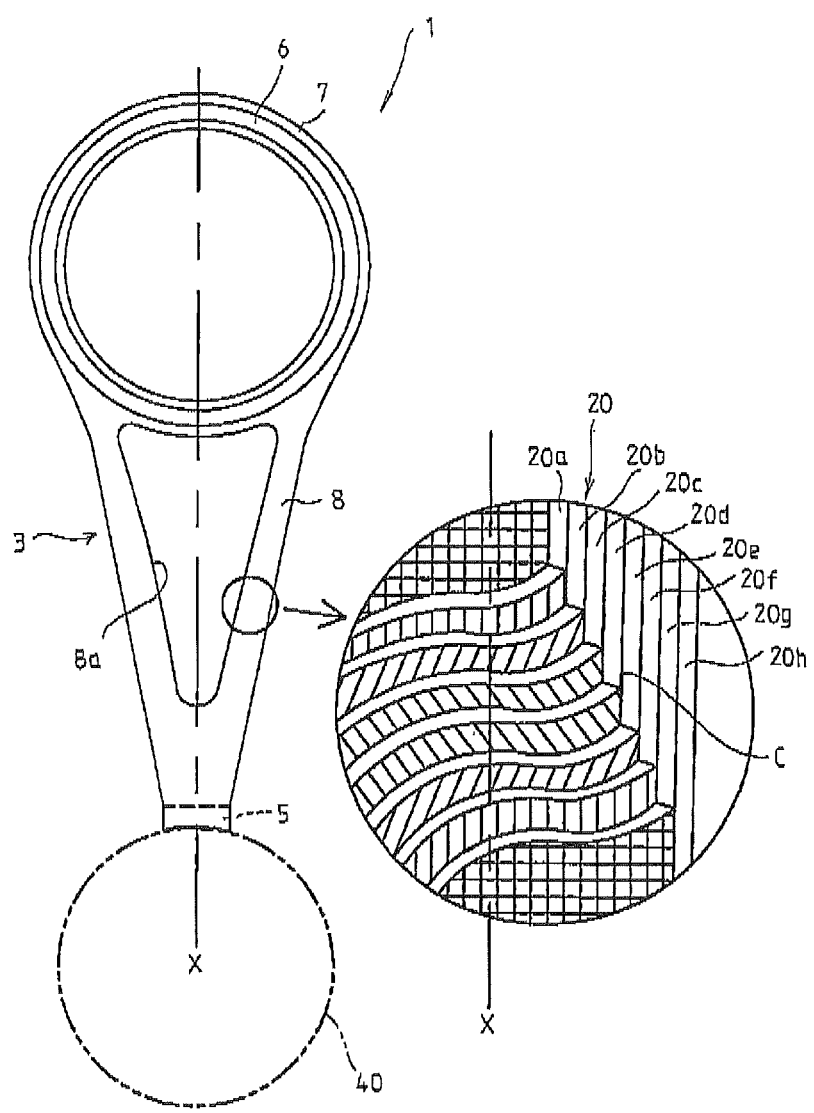
FIG. 9 is a view showing a first embodiment of the frame portion and an enlarged view showing a laminated structure of the prepreg constituting the frame.

Next, a preferable arrangement aspect or the like of the prepregs when forming the frame 3 from the prepreg as described above will be explained with reference to FIG. 9. The fishline guide shown in FIG. 9 is attached to the fishing rod 40 in such a direction that the ring holding portion 7 is located on the front side (the top end side of the fishing rod) and the fixing portion 5 is located on the rear side (the bottom end side of the fishing rod). Here, FIG. 9 is a view when viewing the frame 3 from the front side (the top end side of the fishing rod).

As described above, the frame 3 is constituted by a laminated material 20 having a plurality of fiber-reinforced resin layers in which the prepregs in which reinforcing fibers are impregnated with synthetic resin are laminated in the front-rear direction of the frame, and in this embodiment, a total of 8 layers of prepregs are used. Here, for convenience sake, the layers of the laminated material 20 are defined as a first layer 20a, a second layer 20b, a third layer 20c, a fourth layer 20d, a fifth layer 20e, a sixth layer 20f, a seventh layer 20g, and an eighth layer 20h in order heading from the front side (the top end side of the fishing rod) to the rear side (the bottom end side of the fishing rod) (in this laminated structure, an interface between the fourth layer 20d and the fifth layer 20e, which corresponds to the center of the lamination side, corresponds to the center C of the laminated material 20). In FIG. 9, the vertical direction when viewing the fishline guide from the front (the axial length direction of the fishing rod) is defined as a length axis X of the frame, and a direction of the fibers in each layer is shown by an oblique line or a grid line.

Front and back faces (the first layer 20a and the eighth layer 20h) which correspond to the outermost layers of the laminated material 20 are constituted by fiber-reinforced resin layers which are woven fabrics. In this case, it is preferable that reinforcing fibers constituting the woven fabric be set to be disposed in a direction along the length axis X and a direction (horizontal direction) intersecting with this, as shown in FIG. 9.

The inner layer sides (the second layer 20b and the seventh layer 20g) of the first layer 20a and the eighth layer 20h are constituted by axial fiber-reinforced resin layers which are composed of the reinforcing fibers arranged in one direction which is a direction along the length axis X (it need not exactly coincide with the length axis).

The inner layer sides (the third layer 20c and the sixth layer 20f) thereof are constituted by oblique fiber-reinforced resin layers in which reinforcing fibers are inclined rightward (defined as +) with respect to the length axis X when viewing from the front. In this case, although it is enough if the fibers are inclined rightward with respect to the length axis X, it is preferable that the angle of inclination with respect to the length axis X be in the range of 10° to 60°, and the angles of inclination of the reinforcing fibers of both layers need not exactly coincide with each other.

The inner layer sides (the fourth layer 20d and the fifth layer 20e) thereof are constituted by oblique fiber-reinforced resin layers in which reinforcing fibers are inclined leftward (defined as −) with respect to the length axis X when viewing from the front. In this case, although it is enough if the fibers are inclined leftward with respect to the length axis X, it is preferable that the angle of inclination with respect to the length axis X be in the range of −10° to −60°, and the angles of inclination of the reinforcing fibers of both layers need not exactly coincide with each other.

Accordingly, the layers in the front and the rear of the center C in the thickness direction of the laminated material 20 are all made of the oblique fiber-reinforced resin layers (the fourth layer 20d and the fifth layer 20e) in which reinforcing fibers are inclined leftward, and the outer sides thereof are all made of the oblique fiber-reinforced resin layers (the third layer 20c and the sixth layer 20f) in which reinforcing fibers are inclined rightward. That is, a state is made where at one side and the other side with respect to the center C of the laminated material 20, the oblique fiber-reinforced resin layers in which reinforcing fibers are inclined in the opposite directions to each other with respect to the length axis X of the frame are disposed (the fourth layer 20d and the sixth layer 20f; and the third layer 20c and the fifth layer 20e).

In the aspect of this embodiment, a state is made where at one side and the other side with respect to the center C of the laminated material 20, the oblique fiber-reinforced resin layers in which reinforcing fibers are inclined in the same direction as each other with respect to the length axis X of the frame are disposed (the fourth layer 20d and the fifth layer 20e; and the third layer 20c and the sixth layer 20f).

According to the configuration of the laminated material 20 as described above, a reduction in weight of the frame itself can be achieved, and also it becomes possible to construct a fishline guide which is excellent in relative strength, relative rigidity, and bending properties. In particular, since the oblique fiber-reinforced resin layers in which reinforcing fibers are inclined in the opposite directions to each other with respect to the length axis X of the frame are disposed at one side and the other side with respect to the center C of the laminated material 20, when casting or a fish is caught or in other cases, even if backward and forward bending or torsion of the frame 3 of the fishline guide due to a load applied thereto occurs, a bending direction is not biased, so that breakage or the like can be effectively suppressed. Since there is hardly any concentration of places where the fishline touches the guide ring due to bending of the frame 3, abrasion of the fishline can be prevented.

In the above-described configuration, since on one side and the other side in the front and the rear of the center C of the laminated material 20, the oblique fiber-reinforced resin layers in which reinforcing fibers are inclined in the same direction as each other with respect to the length axis X of the frame in a direction moving away from the center C in the laminating order are respectively disposed in the same order, flexural rigidity and torsional rigidity can be the same in the front and the rear of the frame of the fishline guide 1, so that the frame is prevented from being twisted in a biased fashion in a constant direction with respect to a load.

Since the laminated material 20 having the above-described configuration has the axial fiber-reinforced resin layers (the second layer 20b and the seventh layer 20g) which are composed of the reinforcing fibers arranged in one direction which is a direction along the length axis x, flexural rigidity in a longitudinal axial direction can be increased in this manner.

Further, since the laminated material 20 having the above-described configuration has the fiber-reinforced resin layers which are woven fabrics at the front and back faces (the first layer 20a and the eighth layer 20h) which correspond to the outermost layers, even if the fishline comes into contact with it, cracking, peeling, or the like of the reinforcing fibers hardly occurs, so that an improvement in strength and stabilization of strength can be achieved and also the inner fiber-reinforced resin layers can be effectively protected.

Figure 10:
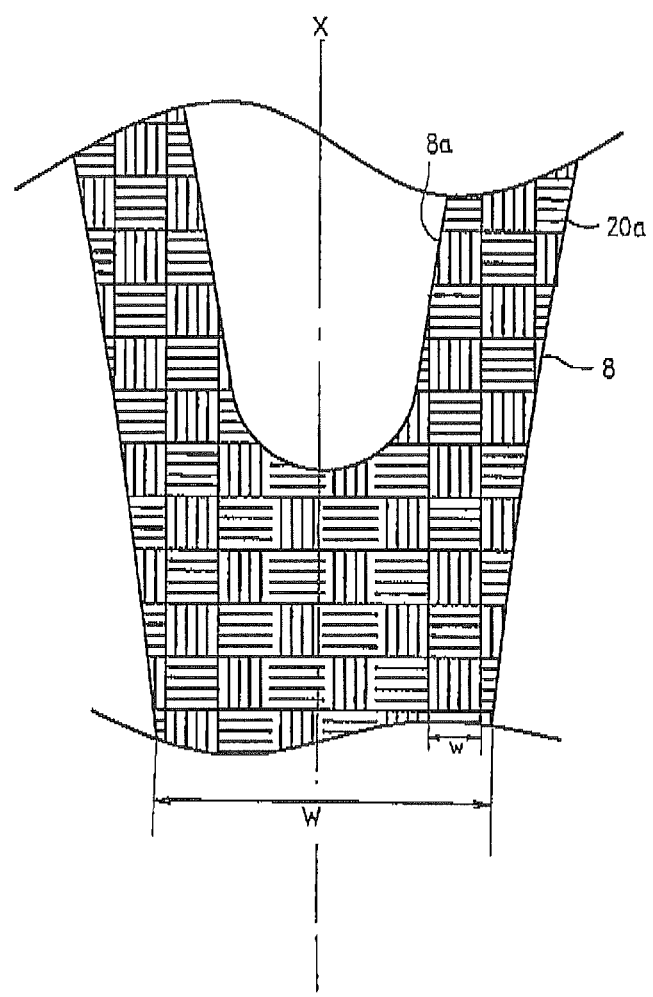
FIG. 10 is a view schematically showing the outermost layer of the frame portion.

In addition, with respect to such fiber-reinforced resin layers 20a and 20h which are woven fabrics, as shown in FIG. 10, it is preferable to use a fiber-reinforced resin layer in which the width w of the mesh of main fibers composed of reinforcing fibers (usually, since a plurality of reinforcing fibers are bundled, thereby constituting a fiber bundle and the fiber bundles are woven into a woven fabric form, the mesh is specified by the width of the fiber bundle) is smaller than the width W (here, the width corresponds to the width of the smallest width portion of the support leg portion) of the support leg portion 8 of the frame 3.

By disposing such fiber-reinforced resin layers 20a and 20h which are woven fabrics, peeling or breakage of the reinforcing fibers can be more reliably prevented and an improvement in strength and stabilization of strength can be achieved. With respect to the above-described bent portions 10a and 10b, they can be relatively reinforced, so that a fishline guide which has excellent balance in terms of strength and light weight can be obtained. Of course, with respect to the width of the mesh of the above-described fiber-reinforced resin layers 20a and 20h which are woven fabrics, it is preferable that also at a region of the fixing portion 5 or the ring holding portion 7, the width of the mesh be likewise made to be smaller than the smallest width of such a portion.

In the arrangement aspect shown in FIG. 10, with respect to the woven fabric, although a direction of the mesh thereof is along the length axis X of the frame, it is preferable to make this be inclined at a given angle with respect to the length axis X. By inclining it in this manner, the reinforcing fibers can be oriented in a direction along the extending direction of the support leg portion 8 which is constituted as described above and a direction intersecting at right angles with it, so that breakage or peeling of the reinforcing fibers can be effectively prevented.

In the above-described configuration, with respect to the oblique fiber-reinforced resin layers (the fourth layer 20d and the sixth layer 20f; and the third layer 20c and the fifth layer 20e) which are respectively provided at one side and the other side in the front and the rear of the center C and in which reinforcing fibers are inclined in the opposite directions to each other, it is preferable to use the prepregs in which the amounts of fibers are the same as each other.

By using such prepregs, rigidity in the front and the rear of the frame can easily become the same, so that a frame with rigidity balanced in the front and the rear is made. In addition, a pair of left and right support leg portions 8 is formed of the same laminated material 20 formed by laminating the same prepregs in the same laminating order, so that rigidity or the like is balanced.

Second Embodiment

Figure 11:
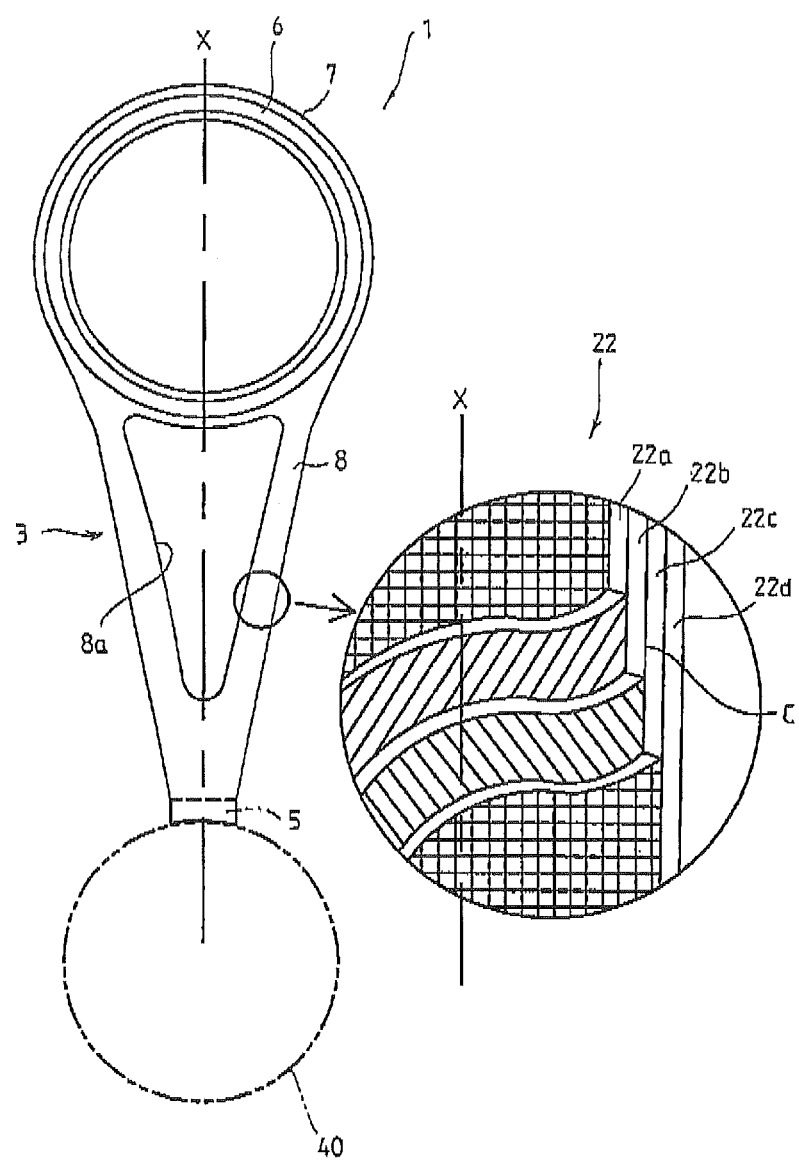
FIG. 11 is a view showing a second embodiment of the frame portion and an enlarged view showing a laminated structure of the prepreg constituting the frame.

FIG. 11 is a view showing a second embodiment of the frame portion and an enlarged view showing a laminated structure of the prepreg constituting the frame.

In a laminated material 22 of this embodiment, a total of four layers of prepregs are used. Similarly to the above-described embodiment, the layers of the laminated material 22 are defined as a first layer 22a, a second layer 22b, a third layer 22c, and a fourth layer 22d in order heading from the front side (the top end side of the fishing rod) to the rear side (the bottom end side of the fishing rod) (in this laminated structure, an interface between the second layer 22b and the third layer 22c corresponds to the center C of the laminated material 22 in the laminating order).

Front and back faces (the first layer 22a and the fourth layer 22d) which correspond to the outermost layers of the laminated material 22 are constituted by fiber-reinforced resin layers which are woven fabrics.

The inner layer side (the second layer 22b) of the first layer 22a is constituted by an oblique fiber-reinforced resin layer in which reinforcing fibers are inclined rightward, and the inner layer side (the third layer 22c) of the fourth layer 22d is constituted by an oblique fiber-reinforced resin layer in which reinforcing fibers are inclined leftward. That is, a state is made where at one side and the other side with respect to the center C of the laminated material 22, the oblique fiber-reinforced resin layers in which reinforcing fibers are inclined in the opposite directions to each other with respect to the length axis X of the frame are disposed.

According to the frame having this configuration, similarly to the above-described embodiment, even if backward and forward bending or torsion of the frame 3 of the fishline guide due to a load applied thereto occurs, a bending direction is not biased, so that breakage or the like can be effectively suppressed. Since there is hardly any concentration of places where the fishline touches the guide ring due to the bending of the frame 3, abrasion of the fishline can be prevented. Further, in this embodiment, due to a reduction in the number of layers, a reduction in weight can be achieved, so that a configuration suitable for a fishline guide on the top end side of the fishing rod of the fishing rod is obtained.

Third Embodiment

Figure 12:
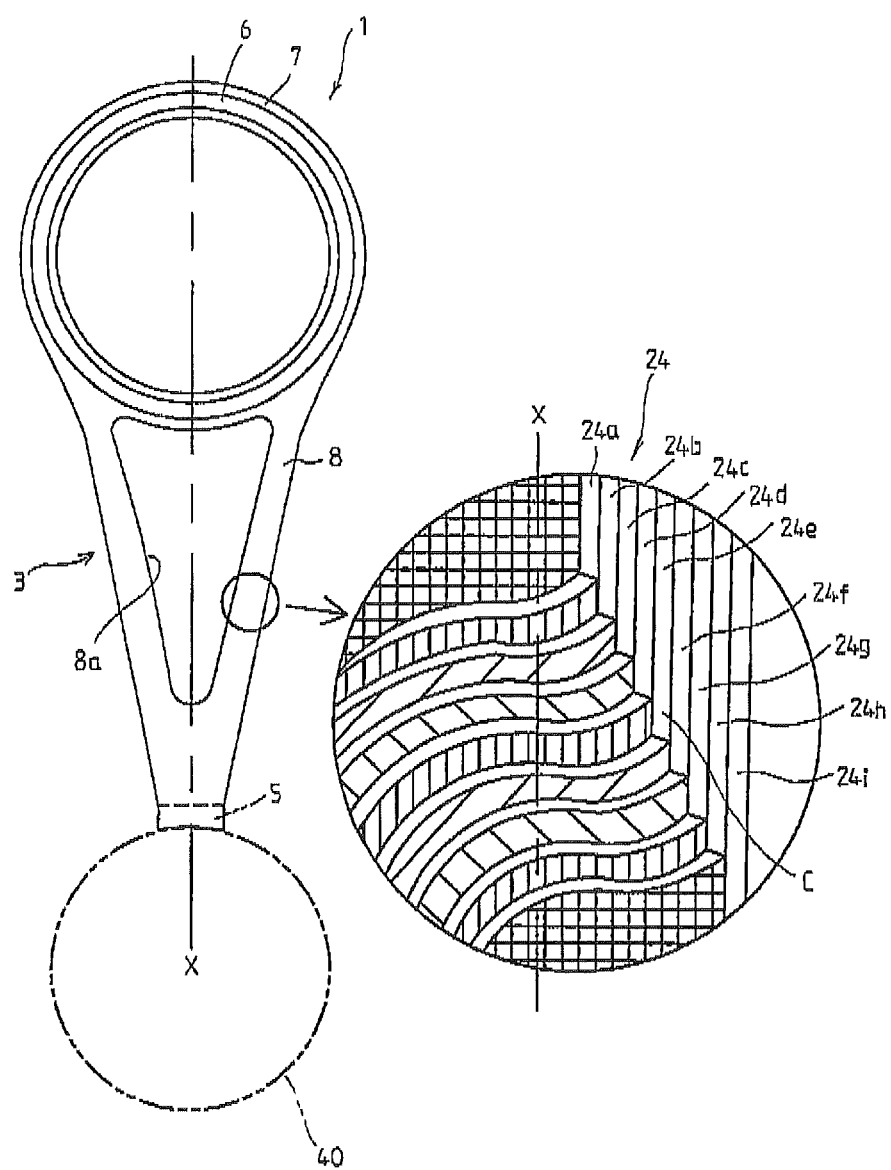
FIG. 12 is a view showing a third embodiment of the frame portion and an enlarged view showing a laminated structure of the prepreg constituting the frame.

FIG. 12 is a view showing a third embodiment of the frame portion and an enlarged view showing a lamination structure of the prepregs constituting the frame.

In a laminated material 24 of this embodiment, a total of nine layers of prepregs are used. Similarly to the above-described embodiment, the layers of the laminated material 24 are defined as a first layer 24a, a second layer 24b, a third layer 24c, a fourth layer 24d, a fifth layer 24e, a sixth layer 24f, a seventh layer 24g, an eighth layer 24h, and a ninth layer 24i in order heading from the front side (the top end side of the fishing rod) to the rear side (the bottom end side of the fishing rod). In the number of laminated layers, which is such an odd number, the fifth layer 24e constitutes a core layer which corresponds to the center C in the laminating order.

Front and back faces (the first layer 24a and the ninth layer 24i) which correspond to the outermost layers of the laminated material 24 are constituted by fiber-reinforced resin layers which are woven fabrics, and the inner layer sides (the second layer 24b and the eighth layer 24h) thereof are constituted by axial fiber-reinforced resin layers which are composed of the reinforcing fibers arranged in one direction which is a direction along the length axis x.

The inner layer sides (the third layer 24c and the seventh layer 24g) thereof are respectively constituted by an oblique fiber-reinforced resin layer in which reinforcing fibers are inclined rightward with respect to the length axis X and an oblique fiber-reinforced resin layer in which reinforcing fibers are inclined leftward with respect to the length axis, and the inner layer sides (the fourth layer 24d and the sixth layer 24f) thereof are respectively constituted by an oblique fiber-reinforced resin layer in which reinforcing fibers are inclined leftward with respect to the length axis X and an oblique fiber-reinforced resin layer in which reinforcing fibers are inclined rightward with respect to the length axis.

The core layer 24e which corresponds to the center C is constituted by an axial fiber-reinforced resin layer which is composed of the reinforcing fibers arranged in one direction which is a direction along the length axis X.

Accordingly, the layers in the front and the rear of the center C (the core layer 24e) of the laminated material 24 are in states where the oblique fiber-reinforced resin layers in which reinforcing fibers are inclined in the opposite directions to each other with respect to the length axis X of the frame are disposed (the fourth layer 24d and the sixth layer 24f), and the layers on the outer sides thereof are also in states where the oblique fiber-reinforced resin layers in which reinforcing fibers are inclined in the opposite directions to each other are disposed (the third layer 24c and the seventh layer 24g).

In addition, the laminated material 24 is in a state where the fiber-reinforced resin layers on both sides with respect to the center C (the core layer 24e) are laminated such that the directions of the fibers become directions symmetrical to each other toward the outer layers.

According to the frame having this configuration, similarly to the above-described embodiments, even if backward and forward bending or torsion of the frame 3 of the fishline guide due to a load applied thereto occurs, a bending direction is not biased, so that breakage or the like can be effectively suppressed. Since there is hardly any concentration of places where the fishline touches the guide ring due to the bending of the frame 3, abrasion of the fishline can be prevented. Further, in this embodiment, since the core layer 24e which is the axial fiber-reinforced resin layer is disposed at the center, even if a bending force acts on the frame 3 along the axial length direction due to tension or the like of the fishline, relative rigidity in the direction can be efficiently increased while a reduction in weight can also be achieved.

In this embodiment, since a state is made where the fiber-reinforced resin layers on both sides with respect to the center C (the core layer 24e) are laminated such that the directions of the fibers become directions symmetrical to each other toward the outer layers, when a force twisting the frame acts on it, it is possible to achieve an improvement in relative strength even with respect to torsion in either the left or the right direction.

Fourth Embodiment

Figure 13:
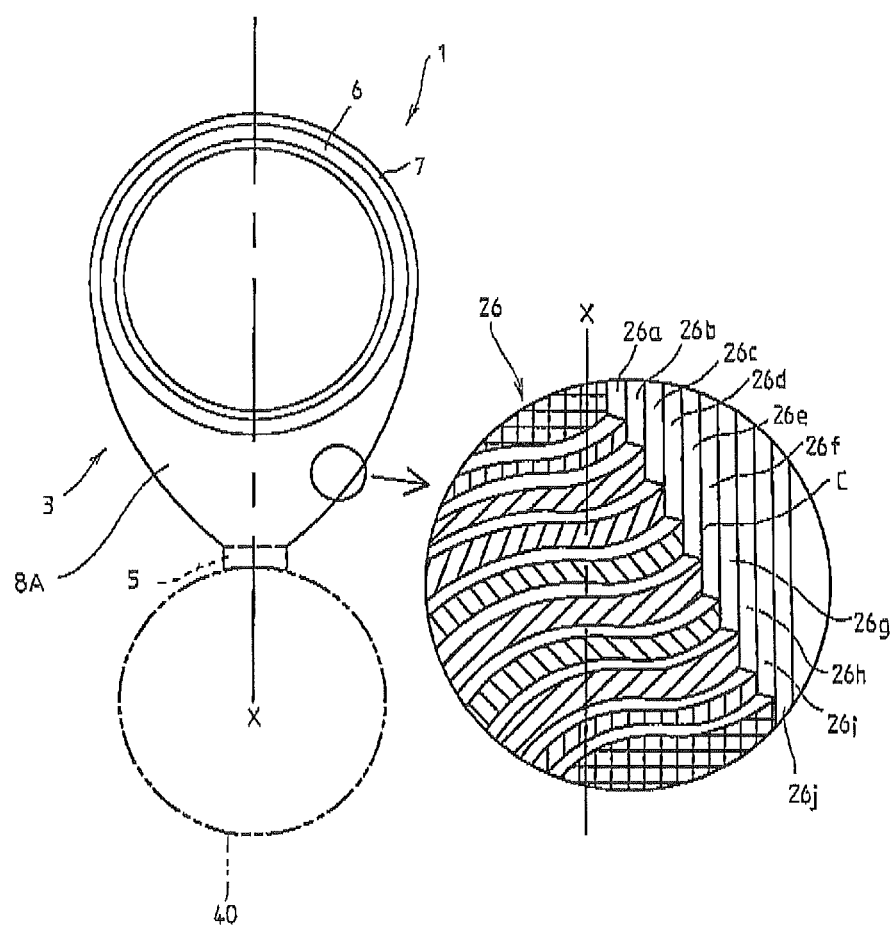
FIG. 13 is a view showing a fourth embodiment of the frame portion and an enlarged view showing a laminated structure of the prepreg constituting the frame.

FIG. 13 is a view showing a fourth embodiment of the frame portion and an enlarged view showing a lamination structure of the prepregs constituting the frame.

In this embodiment, a support leg portion 8A which connects the fixing portion 5 and the ring holding portion 7 is formed into a form of one piece of plate without forming a central window portion (the opening 8a) as in the above-described embodiments. In this manner, a shape of the support leg portion 8A can be suitably modified in accordance with, for example, the kind of fishing rod, a stem of the fishing rod, on which the fishline guide is mounted, or the like, and also with respect to the support leg portion formed into a form of the plate as shown in the drawing, it is possible to suitably modify it, for example, by folding an intermediate portion or performing chamfering. In a laminated material 26 of this embodiment, a total of ten layers of prepregs are used, and similarly to the above-described embodiment, the layers of the laminated material 26 are defined as a first layer 26a, a second layer 26b, a third layer 26c, a fourth layer 26d, a fifth layer 26e, a sixth layer 26f, a seventh layer 26g, an eighth layer 26h, a ninth layer 26i, and a tenth layer 26j in order heading from the front side (the top end side of the fishing rod) to the rear side (the bottom end side of the fishing rod) (in the number of laminated layers, which is such an even number, an interface between the fifth layer 26e and the sixth layer 26f corresponds to the center C of the laminated material 26).

Front and rear faces (the first layer 26a and the tenth layer 26j) which correspond to the outermost layers of the laminated material 26 are constituted by fiber-reinforced resin layers which are woven fabrics, and the inner layer sides (the second layer 26b and the ninth layer 26i) thereof are constituted by axial fiber-reinforced resin layers which are composed of the reinforcing fibers arranged in one direction which is a direction along the length axis X.

The inner layer sides (the third layer 26c and the eighth layer 26h) thereof are all constituted by oblique fiber-reinforced resin layers in which reinforcing fibers are inclined rightward with respect to the length axis X, and the inner layer sides (the fourth layer 26d and the seventh layer 26g) thereof are respectively constituted by an oblique fiber-reinforced resin layer in which reinforcing fibers are inclined rightward with respect to the length axis X and an oblique fiber-reinforced resin layer in which reinforcing fibers are inclined leftward with respect to the length axis.

The layers (the fifth layer 26e and the sixth layer 26f) on both sides with respect to the center C of the laminated material 26 are in states where the oblique fiber-reinforced resin layers in which reinforcing fibers are inclined in the opposite directions (in the fifth layer 26e, the left direction, and in the sixth layer 26f, the right direction) to each other with respect to the length axis X are disposed.

Accordingly, the layers in the front and the rear of the center C of the laminated material 26 are in states where the oblique fiber-reinforced resin layers in which reinforcing fibers are inclined in the opposite directions to each other with respect to the length axis X of the frame are disposed (the fifth layer 26e and the sixth layer 26f), and the layers on the outer sides thereof are also in states where the oblique fiber-reinforced resin layers in which reinforcing fibers are inclined in the opposite directions to each other are disposed (the fourth layer 26d and the seventh layer 26g).

In the frame having this configuration, similarly to the above-described embodiments, even if backward and forward bending or torsion of the frame 3 of the fishline guide due to a load applied thereto occurs, a bending direction is not biased, so that breakage or the like can be effectively suppressed. Since there is hardly any concentration of places where the fishline touches the guide ring due to the bending of the frame 3, abrasion of the fishline can be prevented. In particular, also in this embodiment, similarly to the third embodiment, since the fiber-reinforced resin layers on both sides with respect to the center C (between the fifth layer 26e and the sixth layer 26f) are in states where they are laminated such that the directions of the fibers become directions symmetrical to each other toward the outer layers, when a force twisting the frame acts on it, it becomes possible to achieve an improvement in relative strength even with respect to torsion in either the left or the right direction.

Fifth Embodiment

Figure 14:
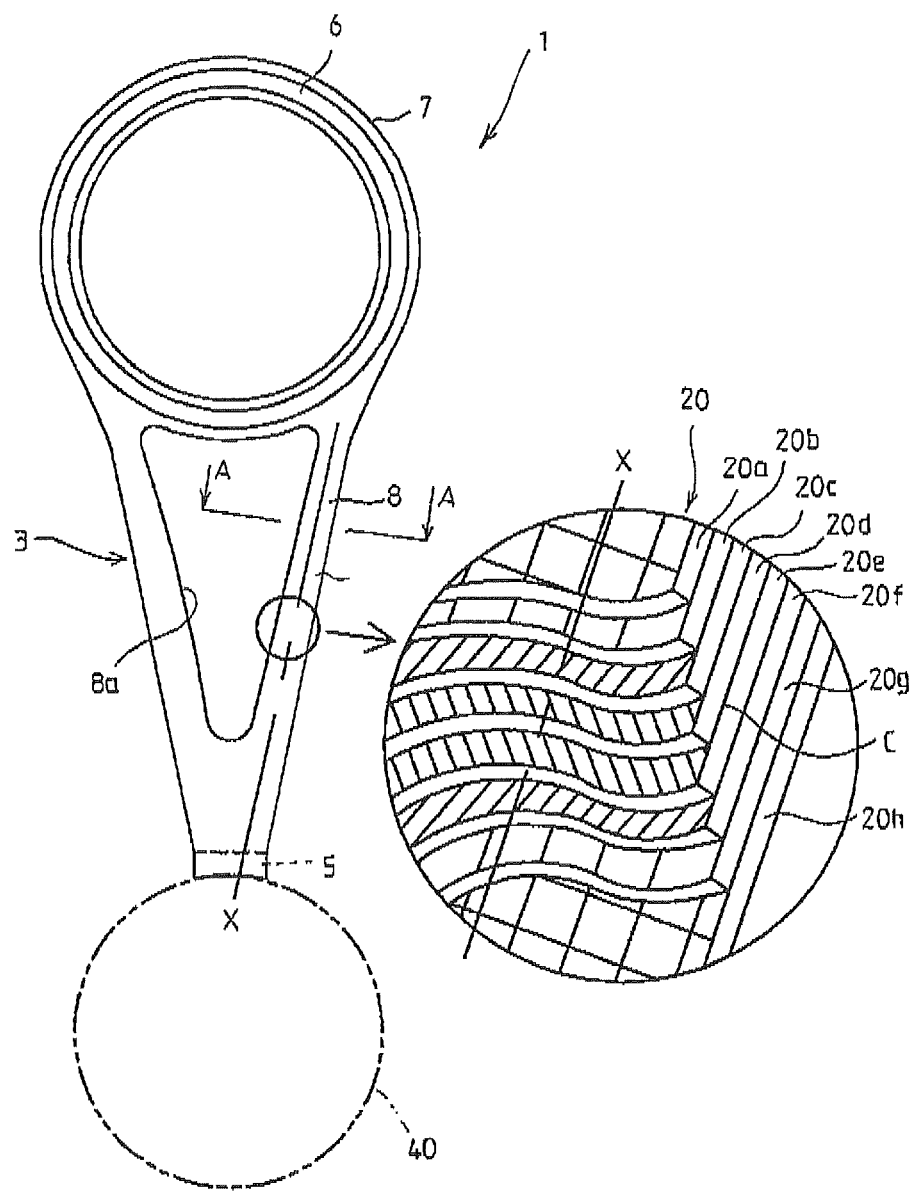
FIG. 14 is a view showing a fifth embodiment of the frame portion and an enlarged view showing a laminated structure of the prepreg constituting the frame.
Figure 15:
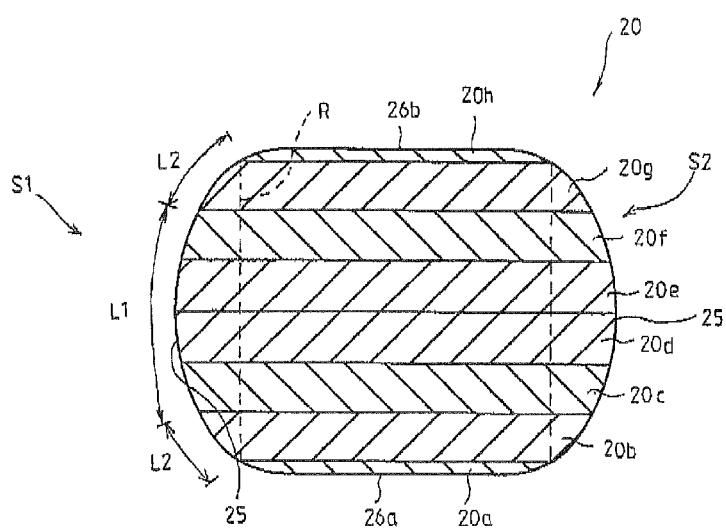
FIG. 15 is a cross-sectional view taken along line A-A of FIG. 14.

Next, a preferable arrangement aspect of the prepreg and a surface treatment method when fowling the frame 3 by the prepreg as describe above will be specifically explained with reference to FIGS. 14 and 15. In these drawings, FIG. 14 is an enlarged view showing a laminated structure of the prepreg constituting the frame, and FIG. 15 is a cross-sectional view taken along line A-A of FIG. 14. Here, in an embodiment which is described below, configurations constituted in the same manner as those of the fishline guides in the above-described embodiments are denoted by the same reference numerals, and the detailed explanation thereof is omitted.

A fishline guide shown in FIG. 14 is attached to the fishing rod 40 in such a direction that the ring holding portion 7 is located on the front side (the top end side of the fishing rod) and the fixing portion 5 is located on the rear side (the bottom end side of the fishing rod). Here, FIG. 14 is a view when viewing the frame 3 from the front side (the top end side of the fishing rod).

Since a laminated structure of the prepreg of FIG. 14 is the same as the laminated structure of the prepreg shown FIG. 9 of the first embodiment, the explanation thereof is omitted. In FIG. 14, a direction X in which the frame 3 (the support leg portion 8) extends is defined as the length axis X of the frame, and the direction of the fibers in each layer is shown by an oblique line or a grid line.

In the molded frame (refer to FIG. 6) cut out from the above-described laminated material 20, a cut face where a laminated state appears becomes a side surface. For this reason, by performing a treatment such that water does not infiltrate or such that peeling is not generated from a boundary portion of the laminated layers, which appears at the side surface, it is possible to obtain a fishline guide having higher durability in addition to the above-described operations and effects.

Further, since the side surface of the frame can come into contact with the fishline, it is preferable to perform a treatment so as to prevent damage to the fishline and also prevent the surface itself from being damaged. In this case, since the reinforcing fibers are configured to have an approximately circular cross-section shape, if cutting-out is performed as shown in FIG. 6, there are many cases where at an exposed portion (an exposed end surface of the fibers) in the side surface, the reinforcing fibers are cut obliquely to the length axis X. Therefore, a state is made where a number of fibers having an end surface of an oval shape are disposed at the surface of the side surface, and such exposed end surfaces of the fibers appear, so that a surface state is obtained which is hardly damaged.

Then, a polishing treatment is performed such that in this exposed state (a state of the side surface), a plurality of laminated layers is made flush with each other and a surface shape in the side surface becomes a convex surface shape, and consequently, interlayer peeling, damage to the fishline, or the like is more effectively prevented. In this case, by performing the polishing treatment, an interlayer in the prepreg which is exposed at the side surface becomes often microscopically slightly concave. However, since the matrix resin (synthetic resin) buries it so as to close it, it does not cause peeling.

The above-mentioned polishing treatment can be realized, for example, by carrying out barrel polishing to remove burrs on the surface and carrying out finishing polishing to the extent that gloss of the surface can be obtained. Specifically, as shown in FIG. 15, in a case where the cross-section of the frame is understood as a rectangular shape R, the surface shapes of surfaces 25 and 25 of both sides S1 and S2 of the laminated material 20 (frame) are convex surface shapes which protrude outward, and the convex surface is continuously formed in a longitudinal direction along the side surface of the frame.

When the above-mentioned polishing treatment is performed, a finishing treatment is performed to form a smooth surface shape such that the reinforcing fibers and the matrix resin are made flush with each other (the end portions of the reinforcing fibers often slightly protrude, but are formed so as to be made approximately flush with each other). Specifically, the surfaces 25 and 25 in the side surfaces are polished such that a mean surface roughness (Ra value) is 10 μm or less.

By this, interlayer peeling of the prepreg is prevented, so that a frame structure with high durability is obtained. Therefore, even if the fishline comes into contact with the frame, the fishline is prevented from being caught or damaged. In addition, by polishing the surfaces 25 and 25 until the mean surface roughness (Ra value) becomes 1 μm or less, even the surface where the reinforcing fibers appear is reliably finished into a smooth surface shape, so that there is no damage which leads to breakage or the like, whereby it is more preferable.

In the cross-section shape shown in FIG. 15, the whole from a front face 26a which is the first layer 20a side to a back face 26b which is the eighth layer 20h is finished to form a curved surface, damage to the fishline which comes into contact with it is reduced. In such a convex surface shape, it is preferable to perform polishing such that curvature of regions (corner portions) L2 of the front face side and the back face side is smaller than that of a region L1 on the central side of the convex surface.

By this, it becomes possible to prevent breaking of the central region L1 which is apt to hit against other objects and come into contact with the fishline.

Figure 16:
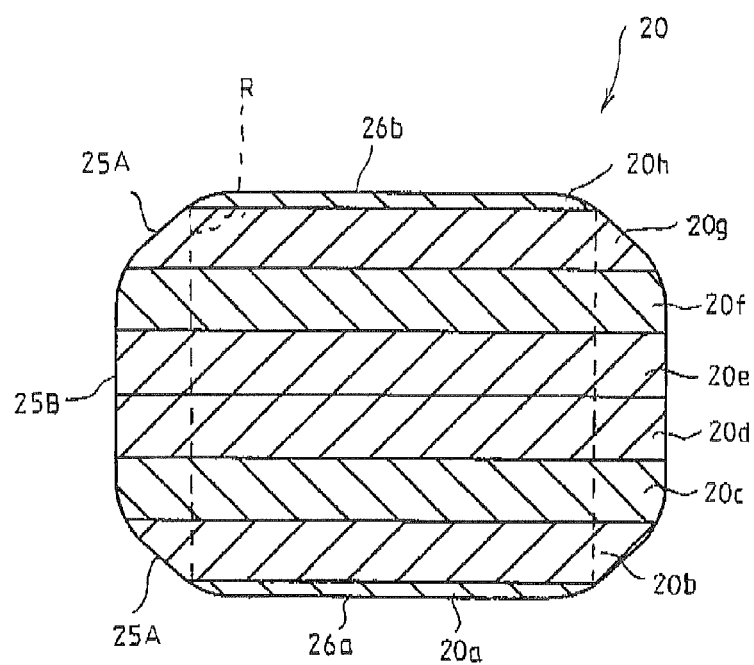
FIG. 16 is a view showing another polishing state with respect to the prepreg constituting the frame.

In addition, with respect to the surface polishing method, besides the state shown in FIG. 15, for example, as shown in FIG. 16, when making the side surface into the convex surface shape, corner portions 25A which transition from the front face 26a and the back face 26b to the side surface may also be chamfered, the whole of a side surface portion 25B may also be made into a planar shape (a portion may also be made into a planar shape), or the regions which transition from the side surface portion 25B of a planar shape to the front face 26a and the back face 26b may also be finished into a curved surface shape without chamfering.

The convex surface shape of each side surface is made into a mountain shape in the front-rear direction, in which the central side is formed to protrude further outward than the regions which transition from the front face 26a and the back face 26b, which are formed at both ends in the front and the rear of the side surface. The convex surface shape is formed along the longitudinal direction of the side surface. In addition, the position which protrudes the most is set to be an intermediate portion between the front and the back. However, it is not limited to the intermediate portion.

With respect to the prepreg constituting the laminated material 20 as described above, by making the impregnation amount of resin be in the range of 15% by weight to 60% by weight, it is possible to reduce weight and increase rigidity. Further, in such a range, in particular, by adopting the range of 20% by weight to 40% by weight, it becomes possible to obtain a frame which is elastic and has stable strength.

In the above-described configuration, since layers (the first layer 20a and the eighth layer 20h) having the reinforcing fibers made into a woven fabric form are disposed at the front and back face sides, the reinforcing fibers having a direction intersecting at right angle with the length axis X are disposed. However, since the corner portions are polished as described above, in fact, such layers do not reach up to the side surfaces.

Accordingly, in the configuration of the above-described laminated material 20, the reinforcing fibers which reach the side surfaces are disposed in parallel to the side surfaces or reach the side surfaces in an inclined direction with respect to the side surfaces. Furthermore, the angle of inclination is small, and the reinforcing fibers of the fiber-reinforced resin layers, which appear at the side surfaces, mostly reach the side surfaces at the angle of 45 degrees or less (at least 60 degrees or less). Therefore, it becomes possible to easily polish the surface.

According to the configuration of the laminated material 20 as described above, a reduction in weight of the frame itself can be achieved, and also it becomes possible to construct a fishline guide which is excellent in relative strength, relative rigidity, and bending properties. In particular, by forming a plurality of fiber-reinforced resin layers which appear at the side surface of the frame 8 to be made flush with each other and also making the surface shape of the side surface into a convex surface shape, even if the fishline comes into contact with the frame, damage to the fishline or the laminated material is suppressed, and peeling or the like of the laminated material is prevented. Therefore, it becomes possible to maintain the above-mentioned performance over a long period of time.

In the above-described configuration, since on one side and the other side in the front and the rear of the center C of the laminated material 20, the oblique fiber-reinforced resin layers in which reinforcing fibers are inclined in the same direction as each other with respect to the length axis X of the frame in a direction getting away from the center C in the laminating order are respectively disposed in the same order, flexural rigidity and torsional rigidity can become the same in the front and the rear of the frame of the fishline guide 1, so that the frame is prevented from being twisted in a biased fashion in a constant direction with respect to a load.

Since the laminated material 20 having the above-described configuration has the axial fiber-reinforced resin layers (the second layer 20b and the seventh layer 20g) which are composed of the reinforcing fibers arranged in one direction which is a direction along the length axis x, flexural rigidity in a length axial direction can be increased in this manner.

Further, since the laminated material 20 having the above-described configuration has the fiber-reinforced resin layers which are woven fabrics at the front and back faces (the first layer 20a and the eighth layer 20h) which correspond to the outermost layers, even if the fishline comes into contact with it, cracking, peeling, or the like of the reinforcing fibers hardly occurs, so that it becomes possible to achieve an improvement in strength and stabilization of strength and effectively protect the inner fiber-reinforced resin layers.

Figure 17:
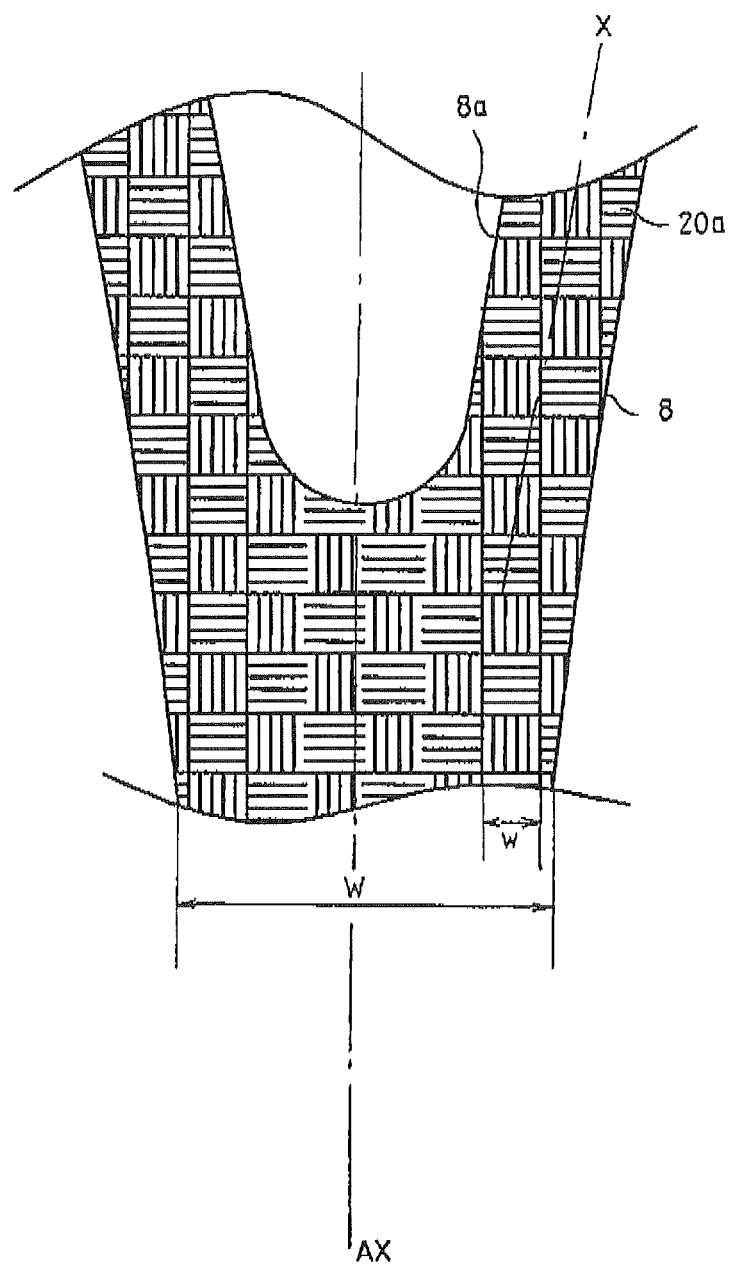
FIG. 17 is a view schematically showing the outermost layer of the frame portion.

In addition, with respect to the fiber-reinforced resin layers 20a and 20h which are woven fabrics, as shown in FIG. 17, it is preferable to use a fiber-reinforced resin layer in which the width w of the mesh of main fibers composed of reinforcing fibers (usually, since a plurality of reinforcing fibers are bundled, thereby constituting a fiber bundle and the fiber bundles are woven into a fabric form, the mesh is specified by the width of the fiber bundle) is smaller than the width W (here, the width corresponds to the width of the smallest width portion of the support leg portion) of the support leg portion 8 of the frame 3.

By disposing such fiber-reinforced resin layers 20a and 20h which are woven fabrics, peeling or breakage of the reinforcing fibers can be more reliably prevented and an improvement in strength and stabilization of strength can be achieved. With respect to the above-described bent portions 10a and 10b, they can be relatively reinforced, so that it becomes possible to obtain a fishline guide which has excellent balance in terms of strength and light weight. Of course, with respect to the width of the mesh of the above-described fiber-reinforced resin layers 20a and 20h which are woven fabrics, it is preferable that also at a region of the fixing portion 5 or the ring holding portion 7, the width of the mesh be likewise made to be smaller than the smallest width of such a portion.

In the arrangement aspect shown in FIG. 17, although the direction of the mesh of the woven fabric is along the vertical direction AX which is in an up-and-down direction, it is preferable to make this be inclined at a given angle with respect to the vertical direction AX. By inclining it in this manner, the reinforcing fibers are disposed in a direction along the above-mentioned length axis X and a direction intersecting at right angles with it, so that breakage or peeling of the reinforcing fibers can be effectively prevented.

Although the embodiment of the present invention has been described above, the present invention is not limited to the above-described configuration, but can be modified in various ways.

The present invention has features that the frame portion constituting the fishline guide is constituted by the fiber-reinforced prepreg, relative strength, relative rigidity, and the like are increased, and further, the side surfaces of the frame are formed to be made flush with each other, and finished into a convex surface shape.

With respect to the shapes of the side surfaces as described above, they may also be formed by, for example, chemical polishing besides barrel polishing. With respect to the degree of the polishing, it is possible to arbitrarily adjust a polishing agent, polishing time, or the like in accordance with a size, a shape, a material property, or the like of the fishline guide. By performing such a processing, it becomes possible to polish the frame without cutting the reinforcing fibers, so that stabilization of strength can be achieved, and also it becomes possible to obtain a fishline guide which is excellent in appearance.

Sixth Embodiment

Next, a preferable arrangement aspect or the like of the prepreg when forming the frame 3 by the prepreg as describe above will be explained with reference to FIGS. 18 to 20. Here, in an embodiment which is described below, configurations constituted in the same manner as those of the fishline guides in the above-described embodiments are denoted by the same reference numerals, and the detailed explanation thereof is omitted.

Figure 18:
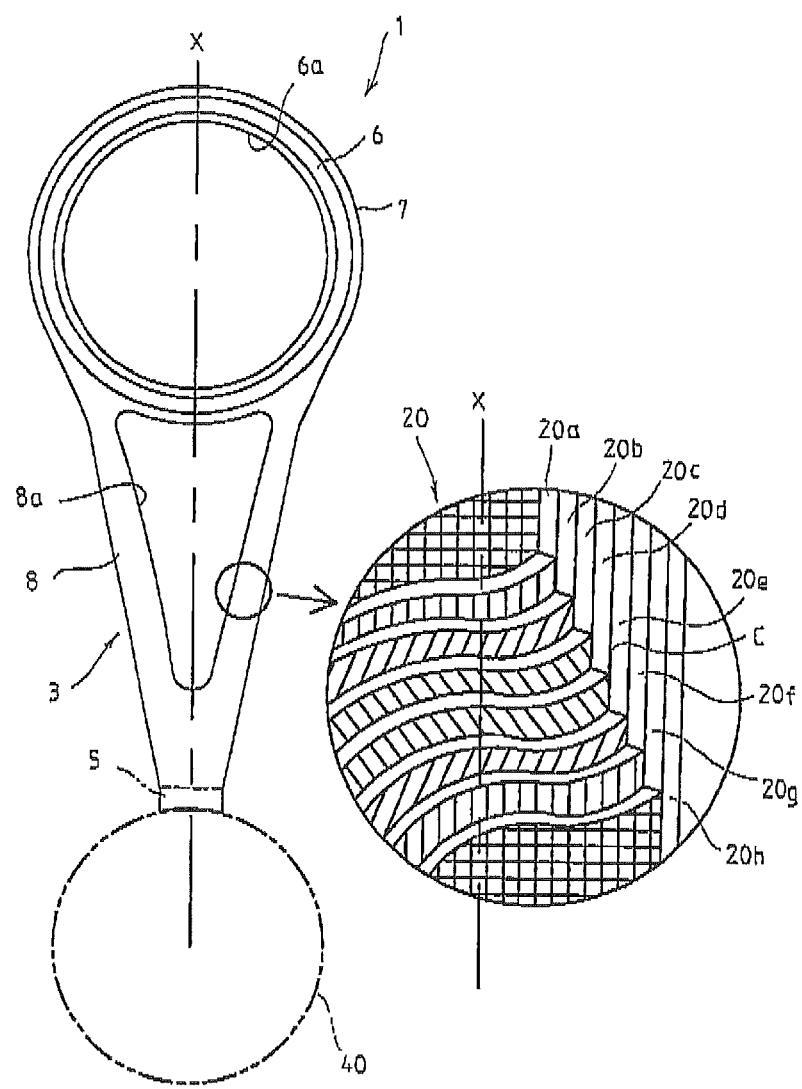
FIG. 18 is a front view showing a sixth embodiment of the fishline guide according to the present invention and an enlarged view showing a laminated structure of the prepreg constituting the frame.

Since a laminated structure of the prepreg of FIG. 18 is the same as the laminated structure of the prepreg shown FIG. 9 of the first embodiment, the explanation thereof is omitted. In this case, the direction of the fibers in each layer is shown by an oblique line or a grid line. In FIG. 18, the vertical direction X when viewing the fishline guide from the front (the axial length direction of the fishing rod) corresponds to a direction along a rising direction when forming the bent portion 10a by raising the fixing portion 5 of the above-described frame 3.

Figure 19:
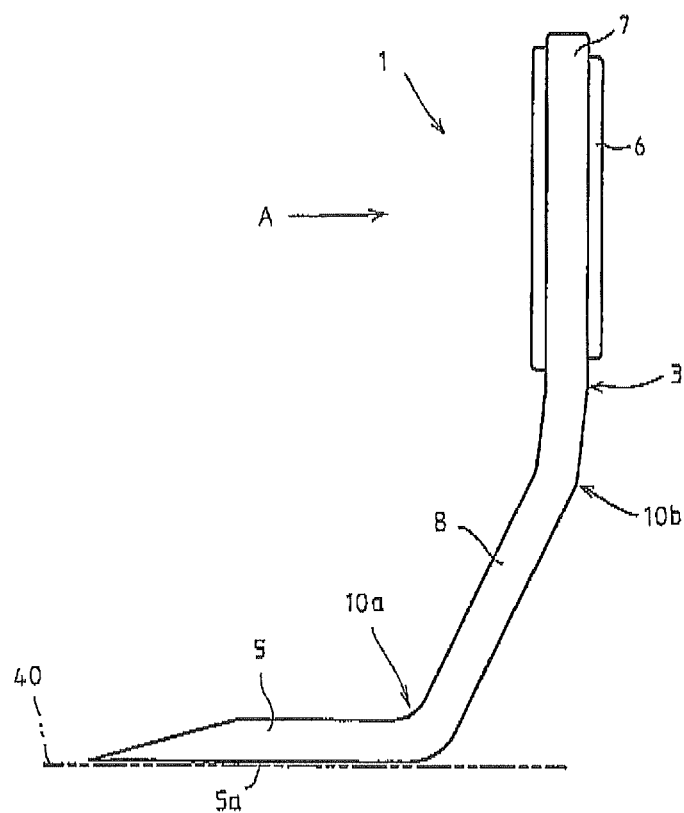
FIG. 19 is a side view of the fishline guide shown in FIG. 1.
Figure 20:
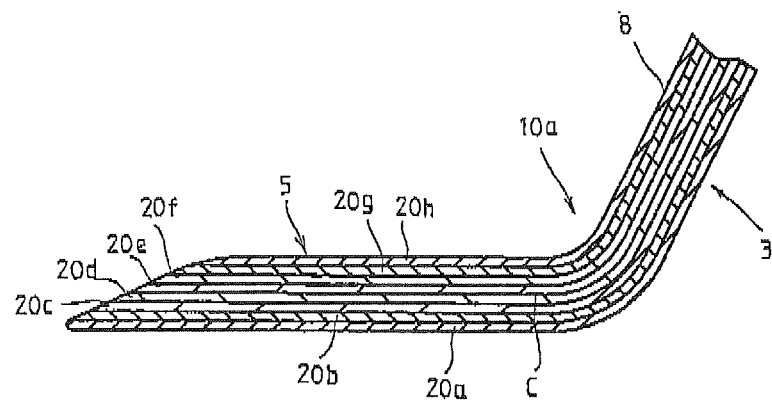
FIG. 20 is an enlarged cross-sectional view of a bent portion of the frame.

In the present invention, a configuration is made such that a reinforcement layer is disposed at the bent portion 10a which rises from the fixing portion 5 shown in FIGS. 19 and 20 toward the support leg portion 8. In this case, in this embodiment, a configuration is made in which a reinforcement layer is disposed over approximately the entire length of the frame, which extends from the fixing portion 5 to the ring holding portion 7, and therefore, also with respect to the bent portion 10b, a configuration is made in which a reinforcement layer is disposed.

Here, a reinforcement layer is a layer which increases flexural rigidity in the front-rear direction of the frame 3 when the fishline guide has been attached to the fishing rod 40, and performs reinforcement such that a change in a bending angle when the bent portion 10a is bent due to a load is small, and it is enough if a configuration is made in which the reinforcing fibers extending along the above-mentioned rising direction (the vertical direction X) are included in any prepreg of a plurality of prepregs which constitute the laminated material 20. Specifically, in FIG. 18, the prepregs constituting the second layer 20b and the seventh layer 20g, which are in a state where they are interposed among a plurality of fiber-reinforced resin layers, are made to have a configuration in which reinforcing fibers are arranged in one direction along the vertical direction X (the rising direction), and have function as reinforcement layers which reinforce the bent portion. It is preferable that such reinforcement layers are disposed at the outer layer sides among the prepregs which are laminated, so as to increase a reinforcement effect at the bent portion.

At the inner layer sides of the laminated material 20, the prepregs in which reinforcing fibers are inclined with respect to the vertical direction X are disposed, thereby improving strength against a torsional direction of the frame. Specifically, as described above, the third layer 20c and the sixth layer 20f, which are located at the inner layer sides of the second layer 20b and the seventh layer 20g, which function as the reinforcement layers, are constituted by oblique fiber-reinforced resin layers in which reinforcing fibers are inclined rightward with respect to the vertical direction X when viewing from the front. In this case, it is preferable that the angle of rightward inclination with respect to the vertical direction X be in the range of more than 10° and not more than 60°, and the angles of inclination of the reinforcing fibers of both layers need not exactly coincide with each other. Further, the inner layer sides (the fourth layer 20d and the fifth layer 20e) thereof are constituted by oblique fiber-reinforced resin layers in which reinforcing fibers are inclined leftward with respect to the length axis X when viewing from the front. In this case, although it is enough if they are inclined leftward with respect to the vertical direction X, it is preferable that the angle of leftward inclination with respect to the vertical direction X be in the range of more than 10° and not more than 60°, and the angles of inclination of the reinforcing fibers of both layers need not exactly coincide with each other.

Then, the first layer 20a and the eighth layer 20h on the outer sides of the above-mentioned reinforcement layers (the second layer 20b and the seventh layer 20g) are the outermost layers, and the prepregs constituting these layers have reinforcing fibers configured into woven fabric forms. In this case, it is preferable that the reinforcing fibers constituting a woven fabric be set so as to be arranged in a direction along the vertical direction X and a direction (the horizontal direction) intersecting at right angles with it, as shown in FIG. 18.

In addition, since the layers of the prepregs which are configured into such woven fabric forms also include the reinforcing fibers extending in the vertical direction X (the rising direction of the bent portion), they have function which reinforces the bent portion.

According to the configuration of the laminated material 20 as described above, it becomes possible to achieve a reduction in weight of the frame itself and also construct a fishline guide which is excellent in relative strength, relative rigidity, and bending properties. In particular, by disposing the oblique fiber-reinforced resin layers in which reinforcing fibers are inclined rightward and leftward with respect to the vertical direction X of the frame, at the inner layers sides of the laminated material 20, even if backward and forward bending or torsion of the frame 3 of the fishline guide due to a load applied thereto occurs when casting or a fish is caught or in other cases, a bending direction is not biased, so that breakage or the like can be effectively suppressed. Since there is hardly any concentration of places where the fishline touches the guide ring due to the bending of the frame 3, abrasion of the fishline can be prevented.

Since the laminated material 20 having the above-described configuration has the fiber-reinforced resin layers (the second layer 20b and the seventh layer 20g; the reinforcement layers) having reinforcing fibers arranged in a direction along the vertical direction X (in a direction along the bent portion), and is in a state where the reinforcing fibers are disposed along the curve of the bent portion, flexural rigidity can be increased. Accordingly, even if the fishline is caught by the fishline guide, whereby a load acts to make the bent portion be drawn in the front-rear direction, breakage or the like of the bent portion can be effectively prevented. At this time, at the same time, although a load is applied such that a plurality of fiber-reinforced resin layers is divided, since deformation of the bent portion is prevented by the reinforcement layers (the second layer 20b and the seventh layer 20g), interlayer peeling is suppressed.

In this embodiment, since a structure is made in which the second layer 20b and the seventh layer 20g are continuously disposed over a range from the fixing portion 5 to the ring holding portion 7, effective reinforcement becomes possible without interlayer peeling at the above-mentioned bent portions 10a and 10b. In particular, since the second layer 20b and the seventh layer 20g (the reinforcement layers) are in a state where they are interposed among a plurality of fiber-reinforced resin layers, and are located at the inner layer sides of the bent portion, peeling of the reinforcement layer itself can also be prevented.

In this case, it is preferable that the reinforcement layer is disposed further toward the outer face side (the top end side of the fishing rod which is large in a radius of curvature) than an intermediate position (denoted by symbol C) among a plurality of fiber-reinforced resin layers. With respect to the arrangement position of the reinforcement layer, it is not particularly limited. However, by disposing the reinforcement layer at the outer face side, it becomes possible to increase a reinforcement effect compared to the case of disposing it on the inner face side (the bottom end side of the fishing rod).

Since the laminated material 20 having the above-described configuration has the fiber-reinforced resin layers which are woven fabric at the front and back faces (the first layer 20a and the eighth layer 20h) which correspond to the outermost layers, even if the fishline comes into contact with it, cracking, peeling, or the like of the reinforcing fibers hardly occurs, so that it becomes possible to achieve an improvement in strength and stabilization of strength and also effectively protect the inner fiber-reinforced resin layers (it has function as a reinforcement layer). That is, by disposing the fiber-reinforced resin layers 20a and 20h which are woven fabric at the outermost layers, peeling or breakage of the reinforcing fibers can be more reliably prevented and an improvement in strength and stabilization of strength can be achieved. With respect to the above-described bent portions 10a and 10b, they can be relatively reinforced, so that it becomes possible to obtain a fishline guide which has excellent balance in terms of strength and light weight.

In addition, it is preferable that in order to be able to increase a reinforcement effect, the reinforcing fibers of the fiber-reinforced resin layers constituting the reinforcement layers be disposed in a direction along the vertical direction X when viewing the fishline guide from the front, as in the second layer 20b and the seventh layer 20g. However, if the angle of inclination with respect to the vertical direction X when viewing the fishline guide from the front is equal to or less than 10° (in the range of +10° to −10° with respect to the vertical direction), the reinforcing fibers may also be somewhat inclined, or, if the reinforcement layers have the reinforcing fibers extending in the vertical direction X, they may also be constituted as woven fabrics as described above.

Although the reinforcement layers may also be provided only at a bent region of the bent portion 10a, it is preferable that they be continuously provided over a range from the fixing portion 5 to the support leg portion 8 through the bent portion 10a.

Seventh Embodiment

Figure 21:
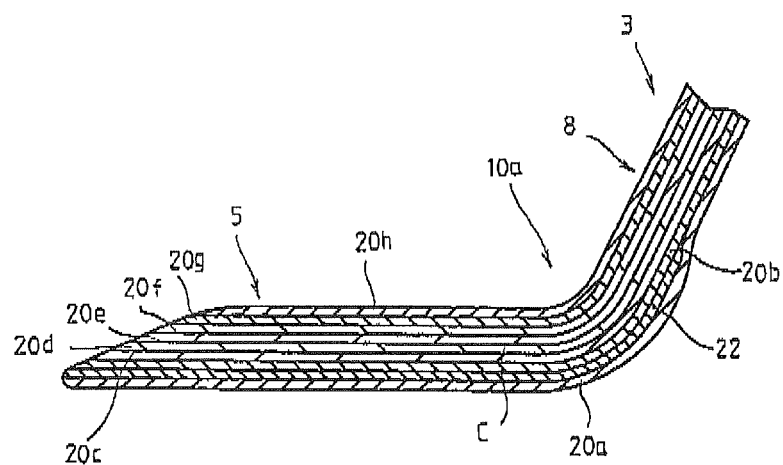
FIG. 21 is a view showing a seventh embodiment of the fishline guide according to the present invention and an enlarged cross-sectional view of a bent portion of the frame.

FIG. 21 is a view showing a seventh embodiment of the fishline guide according to the present invention and an enlarged cross-sectional view of the bent portion of the frame. Here, in an embodiment which is described below, layers constituted in the same manner as the layers constituting the laminated material 20 in the above-described embodiments are denoted by the same reference numerals, and the detailed explanation thereof is omitted.

In this embodiment, in addition to the above-described fiber-reinforced resin layer (reinforcement layer) 20b, a reinforcement piece 22 is additionally disposed at the outer face side of the bent portion 10a. The reinforcement piece 22 includes reinforcing fibers arranged in a direction along the vertical direction X and in this embodiment, is interposed between the second layer 20b (reinforcement layer) which is constituted as described above and the first layer 20a. Further, the reinforcement piece 22 is not to form the frame 3 over a range from the fixing portion to the ring holding portion, but it is enough if the reinforcement piece has a configuration which locally reinforces the bent portion 10a (and as necessary, the bent portion 10b). Specifically, the reinforcement piece is configured to be disposed over a range from an end portion of the fixing portion 5 to a region which covers the bent portion 10a.

In this manner, by further disposing the reinforcement piece 22, which corresponds to another reinforcement layer, at the outer face side of the bent portion, it becomes possible to increase a reinforcement effect. Of course, the reinforcement piece may also be provided further toward the inner face side than the intermediate position C, and by disposing it at the relatively outer face side (a position near to the outer face side of the bent portion), a reinforcement effect can be increased more than the inner face side.

Eighth Embodiment

Figure 22:
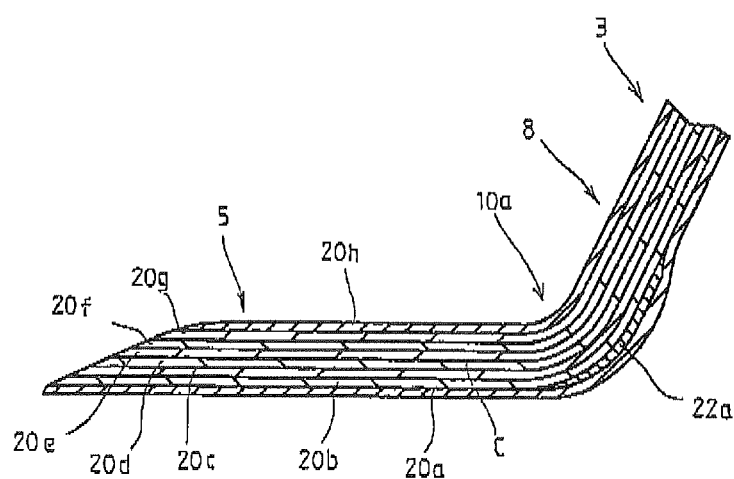
FIG. 22 is a view showing an eighth embodiment of the fishline guide according to the present invention and an enlarged cross-sectional view of a bent portion of the frame.

FIG. 22 is a view showing an eighth embodiment of the fishline guide according to the present invention and an enlarged cross-sectional view of the bent portion of the frame.

As shown in this embodiment, a reinforcement piece 22a is not to have a given length as in the reinforcement piece 22 of the seventh embodiment, but may be disposed to reinforce only the bent portion 10a.

Ninth Embodiment

Figure 23:
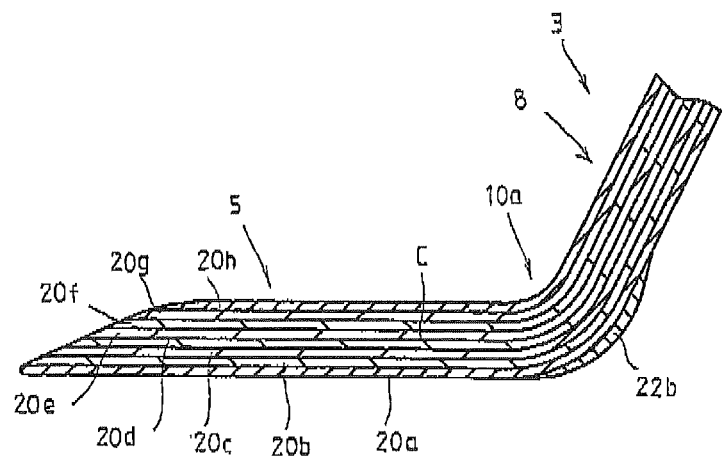
FIG. 23 is a view showing a ninth embodiment of the fishline guide according to the present invention and an enlarged cross-sectional view of a bent portion of the frame.

FIG. 23 is a view showing a ninth embodiment of the fishline guide according to the present invention and an enlarged cross-sectional view of the bent portion of the frame.

As shown in this embodiment, a reinforcement piece 22b is not to be interposed between the layers as in the reinforcement piece 22a of the eighth embodiment, but may also be disposed at an outer layer (the outer side of the fiber-reinforced resin layer 20a formed by a woven fabric, which corresponds to the outermost layer).

Tenth Embodiment

Figure 24:
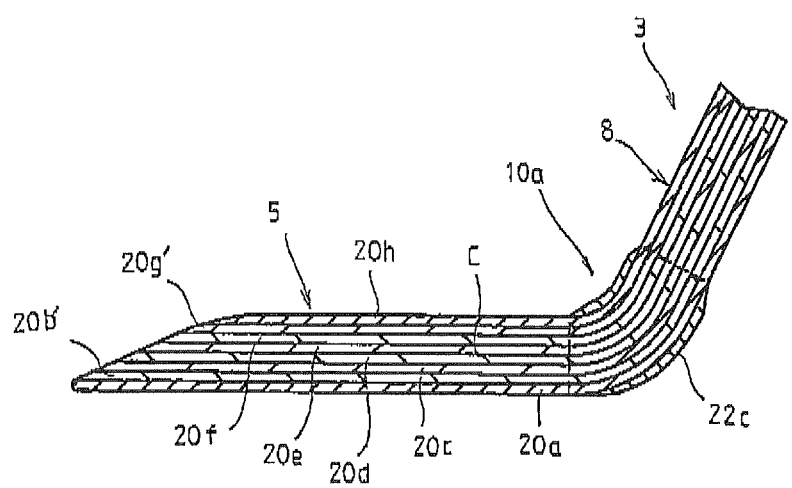
FIG. 24 is a view showing a tenth embodiment of the fishline guide according to the present invention and an enlarged cross-sectional view of a bent portion of the frame.

FIG. 24 is a view showing a tenth embodiment of the fishline guide according to the present invention and an enlarged cross-sectional view of the bent portion of the frame.

In this embodiment, in place of the reinforcement layers (the second layer 20b and the seventh layer 20g) in the sixth embodiment described above, oblique fiber-reinforced resin layers 20b' and 20g' formed by prepregs in which reinforcing fibers are inclined with respect to the vertical direction are disposed, and strength against a twist direction of the frame is further improved. Then, a reinforcement piece 22c is disposed at a region of the bent portion 10a by winding a reinforcing prepreg sheet in a state where reinforcing fibers are disposed along the vertical direction over a given range. In this manner, with respect to the reinforcement piece, it may also have a configuration in which a band-shaped prepreg sheet is wound so as to reinforce the bent portion.

Although the embodiment of the present invention has been described above, the present invention is not limited to the above-described configuration, but can be modified in various ways.

The present invention has features that the frame portion constituting the fishline guide is constituted by the fiber-reinforced prepreg, and also the reinforcement layer (reinforcement piece) as described above is disposed so as to increase relative strength, relative rigidity, or the like and prevent breakage or the like in particular at a region of the bent portion. With respect to the prepreg constituting the above-described frame, the kind, the elastic modulus, or the orientation direction (the angle of inclination) of the reinforcing fibers, the impregnation amount of the resin, the configuration such as a thickness, the number of layers or the state of the lamination, and the like are not limited to the above-described embodiments, but various modifications are possible. With respect to the reinforcement layer (reinforcement piece), it may also be disposed at any of the outer peripheral side and the inner peripheral side of the bent portion, constituted to be exposed at the surface layer side or to be interposed between the layers, or constituted in plural layers.

Eleventh Embodiment

Figure 25:
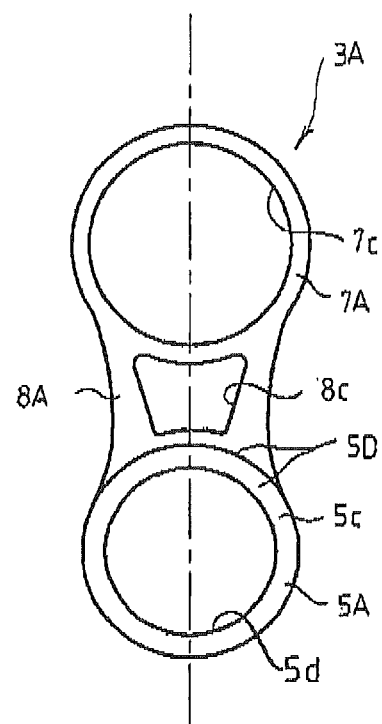
FIG. 25 is a view showing an eleventh embodiment of the fishline guide of the present invention.

FIG. 25 shows an eleventh embodiment of the fishline guide of the present invention.

In the above-described embodiments, a configuration has been described in which the fishline guide is fixed to the fishing rod by a thread tie or the like. However, the fishline guide may also be constituted as, for example, a movable guide which is disposed on the fishing rod so as to be able to slide. In the case of such a movable guide, a configuration may also be made in which a bent portion is not formed at the above-described frame 3. That is, as shown in FIG. 25, a frame 3A is constituted into a flat plate form, on one end side, an opening 5d is formed as a fixing portion 5A (the opening 5d is provided at the fixing portion 5A), and on the other end side, an opening 7c, in which a guide ring can be fixed, is formed as a ring holding portion 7A. As necessary, a cutout 8c is formed in a support leg portion 8A which connects the fixing portion 5A and the ring holding portion 7A. Then, a sliding fixing ring 5c is mounted in the opening 5d, and by fixing a tubular body (not shown) in the opening 5d in which the sliding fixing ring 5c has been mounted, a stem of the fishing rod is engaged with a concavity/convexity portion formed in the inner surface of the tubular body.

In this manner, a configuration in which a bent portion is not formed at a frame may also be adopted in accordance with a mounting position of the fishing rod, and with respect to a prepreg which is used in the frame constituting such a fishline guide, a single layer structure made of a woven fabric layer may also be used. Of course, a laminated structure as described above may also be adopted, and a bent portion may also be separately formed. Or, with respect to a portion (a region denoted by reference numeral 5D) where the sliding fixing ring 5c is mounted, it is formed to be thicker than the ring holding portion 7A. However, the whole may also be formed in the same thickness, and a thickness or a shape can be arbitrarily set.

As described above, in the prepreg constituting the frame, if the orientation directions of the reinforcing fibers in a plan view in a laminated state are in three or more directions, it becomes possible to efficiently improve strength while achieving a reduction in weight. However, the orientation directions of the reinforcing fibers of the prepreg constituting each layer or a lamination position of the prepreg is not particularly limited, but can be suitably modified. In this case, as described above, with respect to the outermost layers of the frame, it is preferable to dispose woven fabric layers so as to be able to effectively prevent breakage or the like.

Twelfth Embodiment

Figure 26:
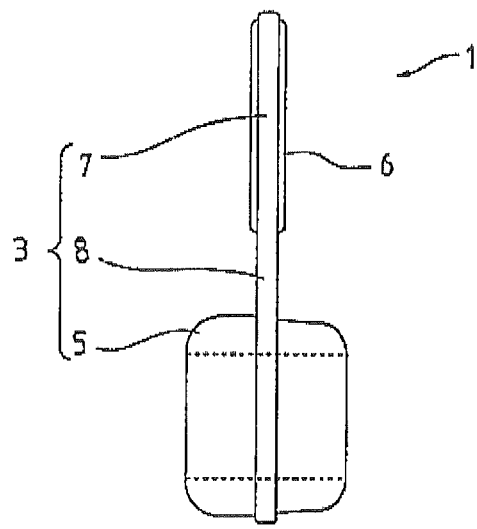
FIG. 26 is a side view showing a twelfth embodiment of the fishline guide of the present invention.

FIG. 26 shows a twelfth embodiment of the fishline guide of the present invention.

The fishline guide 1 of this embodiment is the same as that of the eleventh embodiment in that the fixing portion 5 is formed into a tubular shape. In the fishline guide 1, the fixing portion 5 is not fixed to a fishing rod tube, but is made to be movable in the axial direction of the fishing rod tube, so that the fishline guide is made as a so-called movable guide which is fixed by fitting it to a suitable outer diameter portion of the fishing rod tube having a taper.

In this case, since the fixing portion 5 should have some degree of strength, it is preferable to set it to be thicker than at least the thickness of the ring holding portion 7.

In the fishline guide 1, the frame 3 which is composed of the fixing portion 5, the ring holding portion 7, and the support leg portion 8 is integrally formed by laminating three or more layers prepregs in which reinforcing fibers are impregnated with resin.

Thirteenth Embodiment

Figure 27:
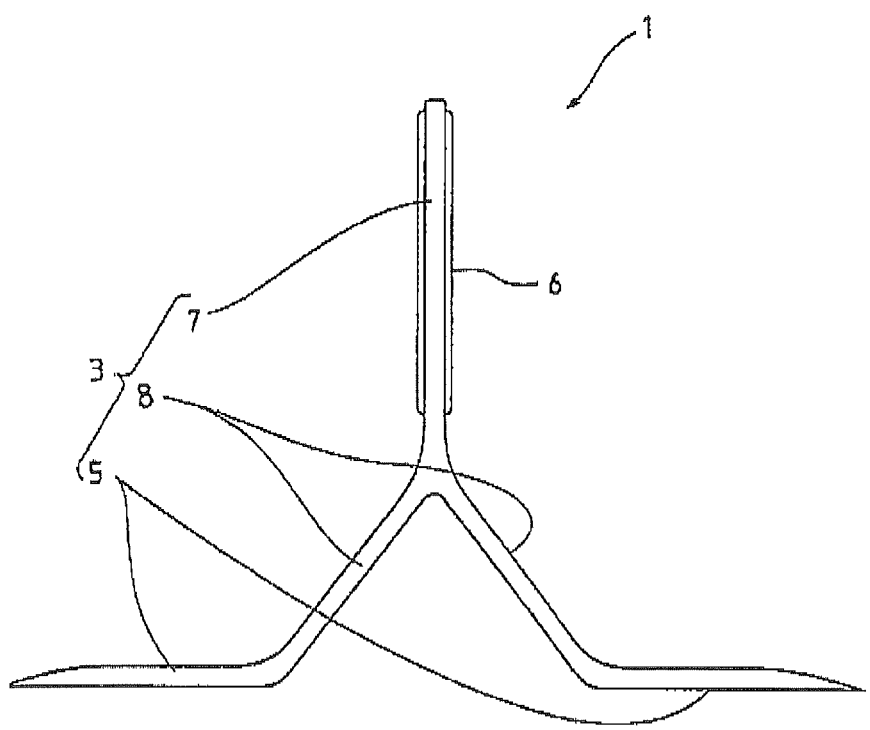
FIG. 27 is a side view showing a thirteenth embodiment of the fishline guide of the present invention.

FIG. 27 shows a thirteenth embodiment of the fishline guide of the present invention.

In the fishline guide 1 of this embodiment, the fixing portion 5 and the support leg portion 8 are respectively provided so as to extend to both sides of the front and the back with the ring holding portion 7 as a center.

In the fishline guide 1, the frame 3 which is composed of the fixing portion 5, the ring holding portion 7, and the support leg portion 8 is integrally formed by laminating three or more layers of prepreg in which reinforcing fibers are impregnated with resin.

Although the embodiments of the present invention have been described above with reference to the drawings, the present invention is not limited to these embodiments, but can be suitably designed or modified within the scope which does not depart from the essential points of the present invention.

For example, as necessary, a coating film may also be formed on the whole or a portion of the frame. In order to improve an appearance by providing decoration and protect the frame 3, painting may also be performed, and vapor deposition of metal or ceramics may also be performed.

At the fixing portion 5, in principle, it is not necessary to carry out a surface treatment for decoration. However, in order to improve or stabilize fixing strength to the fishing rod tube 40, the contact surface 5a may also be coated with a resin layer which is softer than the matrix resin of the lamination shaping material 20, or may also be made into a rough surface by applying paint with particles mixed therein on the contact surface 5a or forming concavity and convexity. Further, a coating film having a high antislip effect may also be formed on the contact surface 5a of the fixing portion 5.

On the other hand, fixing may also be performed by exposing the reinforcing fibers of the lamination shaping material 20 at the contact surface 5a of the fixing portion 5 and placing the contact surface 5a where the reinforcing fibers are exposed, at the fishing rod tube 40.

In addition, it is preferable that the guide ring 6 is fixed to the frame 3 after a surface treatment. However, a barrel processing may also be performed after fixing of the guide ring 6.

Reinforcing fibers may also be disposed at the ring holding portion 7 to extend along the circumferential direction of the ring holding portion 7. In this case, by the reinforcing fibers extending along the circumferential direction, deformation of the opening 7a which is a portion in which the guide ring is set can be suppressed, and similarly to the aforesaid, a holding force for the guide ring 6 can be improved.

In the above-described embodiments, the ring holding portion 7 (fishline passing hole portion) is formed into an annular shape. However, provided that it is a shape capable of holding the guide ring 6, any shape may also be adopted. For example, the ring holding portion 7 (fishline passing hole portion) may also be formed into a partly cut-out annular shape.

What is claimed is:

1. A plurality of fishline guides which are configured to be attached to a rod in an axial direction of the rod, each of the plurality of fishline guides comprising:
 a frame including a fixing portion configured to be attached to an outer surface of the rod, a ring holding portion to which a guide ring through which a fishline passes is attached, and a support leg connecting the fixing portion to the ring holding portion, the fixing portion being in a plane transverse to a plane of the ring holding portion, wherein the frame includes a plurality of fiber-reinforced resin layers formed by laminating a plurality of fiber-reinforced prepregs in which a reinforcing fiber is impregnated with a synthetic resin, wherein a normal line to a plane of each of the fiber-reinforced resin layers, which forms the ring holding portion, is aligned with an axial direction of the ring holding portion, wherein, when the frame is viewed in a direction which is perpendicular to a first direction from the fixing portion toward the ring holding portion and perpendicular to a second direction from the normal line, the plurality of fiber-reinforced resin layers are bent along a shape of the frame, and wherein at least one of the fiber-reinforced resin layers extends through an entirety of said each of the plurality of fishline guides.

2. The plurality of fishline guides according to claim 1, wherein the plurality of fiber-reinforced resin layers includes a layer comprising an axial fiber extending along the first direction and a layer having an oblique fiber extending obliquely along the first direction, and wherein an amount of the oblique fiber is more than that of the axial fiber.

3. The plurality of fishline guides according to claim 1, wherein the frame includes a bent portion which integrally connects the support leg to the fixing portion, and wherein the fixing portion is formed so that an amount of reinforcing fibers of the fixing portion is less than that of the bent portion along more than half of an entire length of the fixing portion.

4. The plurality of fishline guides according to claim 1, wherein the frame includes a bent portion which integrally connects the support leg to the fixing portion, and wherein the fixing portion is formed so that the reinforcing fibers of the fixing portion has a high ratio of reinforcing fibers with a low elastic modulus along more than half of an entire length of the fixing portion.

5. The plurality of fishline guides according to claim 1, wherein an outermost layer of the plurality of fiber-reinforced resin layers includes a woven fabric layer in which reinforcing fibers are woven.

6. The plurality of fishline guides according to claim 1, wherein the support leg includes a pair of narrow parts which are split from the fixing portion and are connected to the ring holding portion, wherein a gap between the pair of narrow parts increases toward the ring holding portion, and wherein the pair of narrow parts includes reinforcing fibers extending along the pair of narrow parts.

7. The plurality of fishline guides according to claim 1, wherein the support leg is angled with respect to the ring holding portion and with respect to the fixing portion.

8. The plurality of fishline guides according to claim 7, wherein the support leg connects the fixing portion to only a part of the ring holding portion.

9. The plurality of fishline guides according to claim 1, wherein the support leg connects the fixing portion to only a part of the ring holding portion.

10. The plurality of fishline guides according to claim 1, wherein the fixing portion is substantially perpendicular to the ring holding portion.

11. The plurality of fishline guides according to claim 1, wherein said each of the plurality of the fishline guides is mounted to the rod such that the ring holding portion is located on a top end side of the rod and the fixing portion is located on a bottom end side of the rod.

12. The plurality of fishline guides according to claim 11, wherein the top end side of the fishing rod includes a front side of the rod and the bottom end side of the rod includes a rear side of the rod.

13. A fishing rod, comprising:
a rod; and
a plurality of fishline guides attached to the rod in an axial direction of the rod, wherein each of the plurality of fishline guides comprises:
a frame including a fixing portion attached to an outer surface of the rod, a ring holding portion to which a guide ring through which a fishline passes is attached, and a support leg connecting the fixing portion to the ring holding portion, the fixing portion being in a plane transverse to a plane of the ring holding portion, wherein the frame includes a plurality of fiber-reinforced resin layers formed by laminating a plurality of fiber-reinforced prepregs in which a reinforcing fiber is impregnated with a synthetic resin, wherein a normal line to a plane of each of the fiber-reinforced resin layers, which forms the ring holding portion, is aligned with an axial direction of the ring holding portion, wherein, when the frame is viewed in a direction which is perpendicular to a first direction from the fixing portion toward the ring holding portion and perpendicular to a second direction from the normal line, the plurality of fiber-reinforced resin layers is bent along a shape of the frame, and wherein at least one of the fiber-reinforced resin layers extends through an entirety of said each of the plurality of fishline guides.

14. The fishing rod according to claim 13, wherein the plurality of fiber-reinforced resin layers includes a layer including a reinforcing fiber extending in a direction obliquely along an axial direction of the rod.

15. The fishing rod according to claim 13, wherein the support leg is angled with respect to the ring holding portion and with respect to the fixing portion.

16. The fishing rod according to claim 15, wherein the support leg connects the fixing portion to only a part of the ring holding portion.

17. The fishing rod according to claim 13, wherein the support leg connects the fixing portion to only a part of the ring holding portion.

18. The fishing rod according to claim 13, wherein the fixing portion is substantially perpendicular to the ring holding portion.

19. The fishing rod according to claim 13, wherein said each of the plurality of the fishline guides is mounted to the rod such that the ring holding portion is located on a top end side of the rod and the fixing portion is located on a bottom end side of the rod.

20. The fishing rod according to claim 19, wherein the top end side of the fishing rod includes a front side of the rod and the bottom end side of the rod includes a rear side of the rod.

* * * * *